(12) United States Patent
Fujita et al.

(10) Patent No.: US 7,248,801 B2
(45) Date of Patent: Jul. 24, 2007

(54) BIDIRECTIONAL OPTICAL COMMUNICATIONS MODULE

(75) Inventors: Hideaki Fujita, Shiki-gun (JP); Yorishige Ishii, Yamatotakada (JP); Toshihiro Tamura, Shiki-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 891 days.

(21) Appl. No.: 10/308,954

(22) Filed: Dec. 3, 2002

(65) Prior Publication Data

US 2003/0118344 A1    Jun. 26, 2003

(30) Foreign Application Priority Data

Dec. 4, 2001    (JP) .............................. 2001-369494

(51) Int. Cl.
| | | |
|---|---|---|
| H04B 10/12 | (2006.01) | |
| H04B 10/04 | (2006.01) | |
| H04B 10/06 | (2006.01) | |
| G02B 6/26 | (2006.01) | |
| G02B 6/42 | (2006.01) | |

(52) U.S. Cl. .................. 398/141; 398/200; 398/214; 385/39; 385/52

(58) Field of Classification Search .......... 398/141, 398/200, 201, 214; 385/39, 49, 51, 52
See application file for complete search history.

(56) References Cited

U.S. PATENT DOCUMENTS 6,626,584 B2 * 9/2003 Fujita et al. .................. 385/88
6,929,405 B2 * 8/2005 Fujita et al. .................. 385/89

FOREIGN PATENT DOCUMENTS

| JP | 53-106503 | 9/1978 |
|---|---|---|
| JP | 61-122614 | 6/1986 |
| JP | 08-234061 | 9/1996 |
| JP | 10-054917 | 2/1998 |
| JP | 11-237535 | 8/1999 |
| JP | 2001-116961 | 4/2001 |
| JP | 2001-133666 | 5/2001 |
| JP | 2001-188149 | 7/2001 |
| JP | 2001-194560 | 7/2001 |
| JP | 2001-324654 | 11/2001 |

* cited by examiner

Primary Examiner—Jason Chan
Assistant Examiner—Nathan Curs
(74) Attorney, Agent, or Firm—David G. Conlin; Steven M. Jensen; Edwards Angell Palmer & Dodge LLP

(57) ABSTRACT

In a bidirectional optical communications module capable of all-dual-mode communications using a single optical fiber, interference due to internally scattered light is reduced by forming a diverging area on a periphery of a transmission lens and providing a thin film reflection mirror which collects incoming light. A inexpensive, compact bidirectional optical communications module can be offered with reduced interference between outgoing and incoming light, especially, interference due to internally scattered light.

20 Claims, 18 Drawing Sheets

BIDIRECTIONAL OPTICAL COMMUNICATIONS MODULE

FIELD OF THE INVENTION

The present invention relates to bidirectional optical communications modules which enables bidirectional communications by means of a single optical communications path element and an optical signal, and in particular to bidirectional optical communications modules for use in home communications, inter-electronics communications and LANs (Local Area Networks).

BACKGROUND OF THE INVENTION

With increasing emphasis on information in society, people are paying attention to network technologies employing an optical communications path element which includes an optical communications path in which optical signals travel. An "optical communications path element which includes an optical communications path in which optical signals travel" here refers to an optical fiber or a plastic optical fiber. Particularly, recent advances in loss reduction and bandwidth expansion of the plastic optical fiber (hereinafter, "POF") have broaden its application range to home communications and inter-electronics communications. Measuring about 1 mm in diameter, a POF is readily coupled to an optical communications module. The use of a POF realizes an optical communications link permitting easy plug-in and pull-out of an optical fiber on an optical communications module.

A majority of conventional optical communications links using an optical fiber as a transmission medium for incoming and outgoing transmission of signal light of an equal wavelength employed all dual mode involving two optical fibers. Drawbacks of using two optical fibers included difficulty in downsizing optical communications modules and high cost of optical fibers to cover longer transmission distances. Bidirectional optical communications modules are therefore being suggested whereby optical communications is possible in all dual mode with only one optical fiber.

In such a bidirectional optical communications module, a single optical fiber is used for both incoming and outgoing transmission, so it is critical to prevent interference between outgoing and incoming light, that is, light sent out to the second party involved in communications and light sent in from that party.

Interference occurs primarily in the following four situations:

(1) An outgoing beam of light is reflected at the transmitter end face of an optical fiber, failing to enter the optical fiber. (Hereinafter, this particular reflection will be referred to as "near end reflection.")

(2) An outgoing beam of light is reflected at the receiver end face of an optical fiber, failing to exit the optical fiber. (Hereinafter, this particular reflection will be referred to as "far end reflection.")

(3) A beam is reflected unnecessarily in the bidirectional optical communications module located at the far end of the line. (Hereinafter, this particular reflection will be referred to as "far end module reflection.")

(4) Light is scattered inside the bidirectional optical communications module. (Hereinafter, this phenomenon will be referred to as "internal scattering.")

In these four cases, the scattering of light in the bidirectional optical communications module is particularly difficult to predict and hence hard to surely reduce interference caused by the internal scattering as in (4).

When used for inter-electronics communications or like purposes, an optical fiber, such as a POF, is about 1 meter long. The distance covered is relatively short and the light exiting the optical fiber may hurt the human eye. Considerations should be given to eye health risks (eye safety) in such communications. In consideration of eye safety, in such communications, the quantity of outgoing light (quantity of light exiting the optical fiber) must be set to a low value.

Typically, a semiconductor laser is used as a light source for an optical communications module. The following description will present some points to which one should pay attention in using a semiconductor laser as a light source for an optical communications module.

FIG. 18 shows a relationship between the drive current and the light output of a semiconductor laser in the range where the light output does not saturate. In the range where the light output does not saturate, the relationship between the drive current and the light output can be approximated by a broken line consisting of two straight lines. The graph in FIG. 18 indicates the light output on the vertical axis and the drive current on the horizontal axis. Comparing the two straight lines, it would be understood that the slopes of the lines differ in magnitude, although both being positive. According to FIG. 18, plotting light outputs on the vertical axis and drive currents on the horizontal axis, their relationship is represented by a straight line extending from the original point. The line however increases its slope at one particular value. In FIG. 18, the region from the original point to the value where the slope alters is indicated as B, and the region succeeding the value where the slope greatly alters is indicated as A. An extension of the straight line from the region A cuts the horizontal axis at a point indicated as Ith which represents threshold current. The regions A and B in FIG. 18 may be described approximately as being a laser oscillation region and a spontaneous emission region respectively.

If a pulse current greater than Ith is fed as a bias current, a great light output is produced when the pulse signal passes through 0 value. Therefore, the light-off ratio becomes large. Conversely, if a current less than Ith is used as a bias current, a reduction in pulse width (change in duty ratio) occurs due to an oscillation delay. Therefore, normally, the bias current is set to about Ith. If the bias current is set to around Ith, there is spontaneously emitted light even when the pulse signal is 0; therefore, a light-off ratio is determined from the ratio of the spontaneously emitted light and the light output when the pulse signal is 1. For example, to achieve a light-off ratio of 10 or more with a semiconductor laser having spontaneously emitted light of 0.3 mW, the maximum output (the output when the pulse signal is 1) needs to be set to 3 mW or more. In this manner, attention needs to be paid to the light-off ratio and changes in duty ratio.

When using an optical fiber for inter-electronics communications and like purposes, safety (eye safety) should be considered. For eye safety, the amount of outgoing beam must be set to a lower value. In using a semiconductor laser as a light source, the amount of outgoing beam can be set to a low value in several manners, one of which is to reduce the output of the semiconductor laser. However, reducing the output of the semiconductor laser makes it difficult to satisfy the light-off ratio mentioned in the above points to be considered. Further, reducing the bias current changes the duty ratio, which becomes a problem in carrying out communications. Therefore, an attempt to set the amount of outgoing beam to a low value by reducing the output of the semiconductor laser raises light-off ratio and duty ratio problems, failing to produce satisfactory results.

When using a semiconductor laser as a light source, there is another method to set the amount of outgoing beam to a low value: that is, to lower the coupling efficiency (transmission efficiency) of the outgoing beam from the semiconductor laser to the optical fiber.

The transmission efficiency can be lowered either of the two methods: (i) to lower the amount of light by the use of a filter or polarizer with a low optical transmittance, and (ii) to collect the light output of a light-emitting device and to cut off beams of light which exit at large angles using a lens called transmission lens with a small transmission lens diameter when coupling light to the optical fiber.

According to method (i), if interference occurs, interference due to far end module reflection as in (3) increases. Therefore, method (i) is difficult to apply to all dual communications using a single optical fiber. Further, other problems of method (i) include greater numbers of components. For these reasons, generally, method (ii) is used in all dual communications using a single optical fiber.

However, in method (ii), a greater proportion of light, which is cut off by the transmission lens, does not play any practical role in transmission. Therefore, if interference occurs, there is a problem of interference due to internal scattering as in (4) being likely to increase. Especially, to carry out all dual communications using a single optical fiber, the incoming beam exiting the optical fiber needs to be efficiently coupled to the light-receiving device. However, increasing reception efficiency inevitably leads to efficient reception of beams created by near end reflection and internal scattering, which in turn leads again to a problem of even more interference.

Japanese Unexamined Patent Application 11-237535/1999 (Tokukaihei 11-237535; published on Aug. 31, 1999 and Japanese Unexamined Patent Application 2001-116961 (Tokukai 2001-116961; published on Apr. 27, 2001) disclose conventional optical communications modules, which are now described immediately below.

An optical communications module described in Tokukaihei 11-237535 is now explained in reference to FIG. 19. The optical communications module is adapted with respect to the angles of outgoing beams 108, so that reflections 117 of the outgoing beams 108 do not enter a light-receiving device 105 which forms a light-receiving face. A light-emitting device 104 emits light and sends out at least part of it as the outgoing beams 108. A transmission lens 106 collects the output light from the light-emitting device 104 to form the outgoing beams 108. Having been collected, the outgoing beams 108 change their paths as they are reflected off an upward reflection mirror 110. Then, the outgoing beams 108 enter the optical fiber 102. Incoming beams 109 exiting the optical fiber 102 are coupled to the light-receiving device 105 positioned opposite to the optical fiber 102. In such an optical communications module, the reflections 117, which have exited the transmission lens 106 and reflected off the optical fiber 102, illuminates part of the light-receiving device 105 other than the light-receiving face: in other words, the outgoing beams 108 are incident on the optical fiber 102 from directions other than the directions in which the incoming beam 109 exit the optical fiber 102. By causing the outgoing beams 108 to enter in this manner, the reflections 117 illuminate part of the light-receiving device 105 other than the light-receiving face. As a result, interference due to near end reflection can be prevented from happening.

An optical communications module described in Tokukai 2001-116961 is now explained in reference to FIG. 20. The optical communications module employs a light-block plate 207. Outgoing beams 208, which are at least part of the light emitted by the light-emitting device 204, are first collected by a transmission lens 206 and then couple to an optical fiber 202. Meanwhile, the incoming beams 209 radiating from the optical fiber 202 are collected by a reception lens 224 and then coupled to the light-receiving device 205. The light-block plate 207 made of metal, etc. is disposed between a transmitting section and a receiving section. When the outgoing beams 208 are coupled to the optical fiber 202, some of the outgoing beams 208 are reflected off the optical fiber 202; the reflections are however prevented by the light-block plate 207 from being coupled to the light-receiving device 205.

According to the method disclosed in Tokukaihei 11-237535 (FIG. 19), to prevent the reflections 117 from entering the light-receiving device 105, the outgoing beams 108 need to be greatly inclined relative to the optical axis of the optical fiber 102. A greater inclination of an outgoing beam 108 to the optical axis of the optical fiber 102 results in a greater numerical aperture (NA) when the outgoing beam 108 is coupled to the optical fiber 102 and also in a deviated incident angle of the outgoing beam 108 on the optical fiber 102. In other words, the outgoing beams 108 are excited only in higher modes, not in lower modes.

As described in the foregoing, a greater numerical aperture (NA) results in a greater effect of mode dispersion in the optical fiber 102. Therefore, problems arise where transmission bandwidth is narrowed and transmission loss in the optical fiber 102 increases.

Further, coupling a deviated outgoing beam 108 to the optical fiber 102 causes following problems. If the optical fiber 102 is short, the outgoing beam 108 exits the optical fiber 102 before being stabilized and therefore the exiting light includes almost no lower modes. As a result, the light exiting the optical fiber 102 is deviated. Further, the distribution of the exiting light is like a ring with little light exiting the center of the optical fiber 102. The deviation and distribution of light affects the reception efficiency of the other module, which is a problem.

A small incident angle of the outgoing beam 108 onto the optical fiber 102 causes following problems. The light "kicked" by the transmission lens 106, that is, transmitted through the periphery of the transmission lens 106, is reflected as it hits the optical fiber 102, an optical fiber plug, etc. The reflected light is likely to cause internal scattering, which is also a problem.

According to the method disclosed in Tokukai 2001-116961 whereby the light-block plate 107 (FIG. 20) is used to separate a transmitting section and a receiving section, the part of the region of the optical fiber 102 which corresponds to the thickness of the light-block plate 107 cannot be used. Therefore, a problem arises where the reception efficiency falls. Further, this leads to a greater number of components and higher costs. The light "kicked" by the transmission lens 106, that is, transmitted through the periphery of the transmission lens 106, is reflected as it hits the optical fiber 102, the optical fiber plug, etc. The reflection lighted is likely to cause internal scattering, which is also a problem.

Especially, in an optical communications module using a POF, because of the relationship between the eye safety problems and the light-off ratio, the outgoing beams coupled to the optical fiber 102 need to be reduced by narrowing the diameter of the transmission lens 106. Reducing the outgoing beam in this manner causes increases of the light transmitted through the periphery of the transmission lens 106. As a result, conventional bidirectional optical communications modules have a problem that the light transmitted through the periphery of the transmission lens 106 becomes stray light and causes internal scattering. Note that stray light here refers to the light exiting the light-emitting device that the transmission lens 106 has prevented from being coupled to the optical fiber.

A method of reducing stray light is disclosed in Japanese Unexamined Patent Application 61-122614/1986 (Tokukai-sho 61-122614; published on Jun. 10, 1986) as a method of providing a light-blocking body to a collimator lens used in a light isolator. That is, a light-blocking body is inserted between a semiconductor laser and a collimator lens, to reduce stray light produced in the lens. Further, stray light is prevented from returning to the semiconductor laser, so as to drive the semiconductor laser in a stable manner.

However, the method is to prevent self-emitted light from returning to the light source, and cannot prevent interference with a light-receiving device as with a bidirectional optical communications module. Further, the method is to reduce stray light in a lens, and cannot prevent stray light in an optical communications module or scattered light at an optical fiber plug, etc. Further, the light-emitting point of the semiconductor laser is minuscule, and it is sufficient if the method can prevent light from returning to the miniscule light-emitting point. However, in a bidirectional optical communications module, it is also necessary to separate incoming beams, and it becomes more difficult to reduce internal scattering of light. Moreover, the separation of internally scattered light and outgoing light needs to be clearly performed. Further, in cases where a light-blocking body is inserted, attentions needs to be paid also to insertion precision, managing, and attaching of the light-blocking body and degradation due to aging of the light-blocking body. This necessitates more costs and causes problems to the performance of the bidirectional optical communications module.

SUMMARY OF THE INVENTION

The present invention has an objective to offer a bidirectional optical communications module with a high reception efficiency which is capable of carrying out bidirectional communications using an optical communications path element, such as a single optical fiber, and reducing crosstalk by separating outgoing light from stray light.

To achieve the objective, a bidirectional optical communications module in accordance with the present invention is a bidirectional optical communications module for bidirectionally communicating with another party by (i) transmitting, via a single optical communications path element which includes an optical communications path in which an optical signal travels, an optical signal by causing light to enter the optical communications path through an end face the optical communications path element from a light-emitting device and (ii) receiving at a light-receiving device an optical signal by receiving incoming light exiting the optical communications path through the end face of the optical communications path element, and is characterized in that the module includes:

a first outgoing light control section which receives, of light emitted by the light-emitting device, first outgoing light to be transmitted and which controls the first outgoing light so that the first outgoing light emitted by the light-emitting device enters the optical communications path through the end face of the optical communications path element; and a second outgoing light control section which receives, of light emitted by the light-emitting device, second outgoing light not to be transmitted and which controls the second outgoing light so that at least part of the second outgoing light enters neither the optical communications path which receives the first outgoing light nor the end face of the optical communications path element.

According to the arrangement, the light emitted by the light-emitting device can be clearly separated into the first outgoing light to be transmitted and the second outgoing light not to be transmitted. The clearness of the separation, as a means to satisfy requirements for eye safety, is effective when a small lens is used in the first outgoing light control section to reduce transmission efficiency. In other words, the present invention controls stray light even if stray light, which is a second outgoing light, is generated by the use of the small lens. As a result, a bidirectional optical communications module can be obtained which satisfies requirements eye safety even if the output of the light-emitting device is kept sufficiently high and the light-off ratio is made sufficiently large.

Further, according to the arrangement, at least part of light the second outgoing light hits neither the end face of the optical communications path element nor the optical communications path. In other words, at least part of light of the second outgoing light is made not to hit neither the end face of the optical communications path element nor the optical communications path. Therefore, reflection of at least part of light of the second outgoing light off the end face of the optical communications path element or the optical communications path decreases. Such a decrease in reflection light restrain the reflection light from entering the light-receiving device and can therefore effectively restrain interference between the second outgoing light and the incoming light. The interference here refers to, for example, the reflection light entering the light-receiving device to interfere with the incoming light as such.

For a fuller understanding of the nature and advantages of the invention, reference should be made to the ensuing detailed description taken in conjunction with the accompanying drawings.

BRIEF DESCRIPTION OF THE DRAWINGS

FIG. 6(b) is a plan view showing the arrangement in FIG. 6(a) as viewed from direction C.

DETAILED DESCRIPTION OF THE PREFERRED EMBODIMENTS

Embodiment 1

The following will describe an embodiment of the present invention in reference to FIGS. 1 to 15.

It is not intended to restrict the present invention to the following embodiments, and various changes and modifications are possible within the scope of the present invention.

Figure 1:
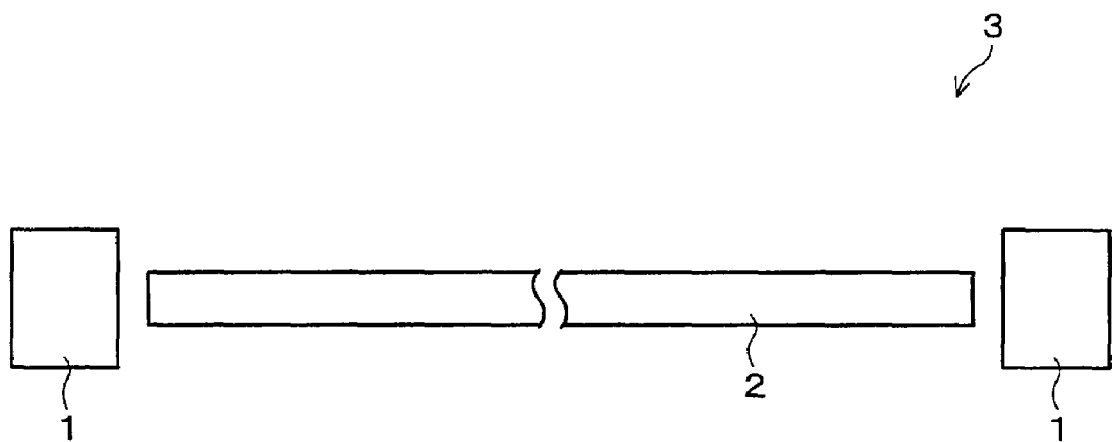
FIG. 1 is a plan view showing an arrangement of a bidirectional optical communications module in accordance with the present invention.

FIG. 1 shows an arrangement of a bidirectional optical communications link. The bidirectional optical communications link 3 includes an optical fiber 2 for bidirectionally transmitting modulated light suited to transmission based on a data signal to be transmitted. Further, the bidirectional optical communications link 3 includes a bidirectional optical communications module 1 at each end of the optical fiber 2. The optical fiber 2 is a type of optical communications path elements which includes an optical communications path in which optical signals travel.

Figure 2:
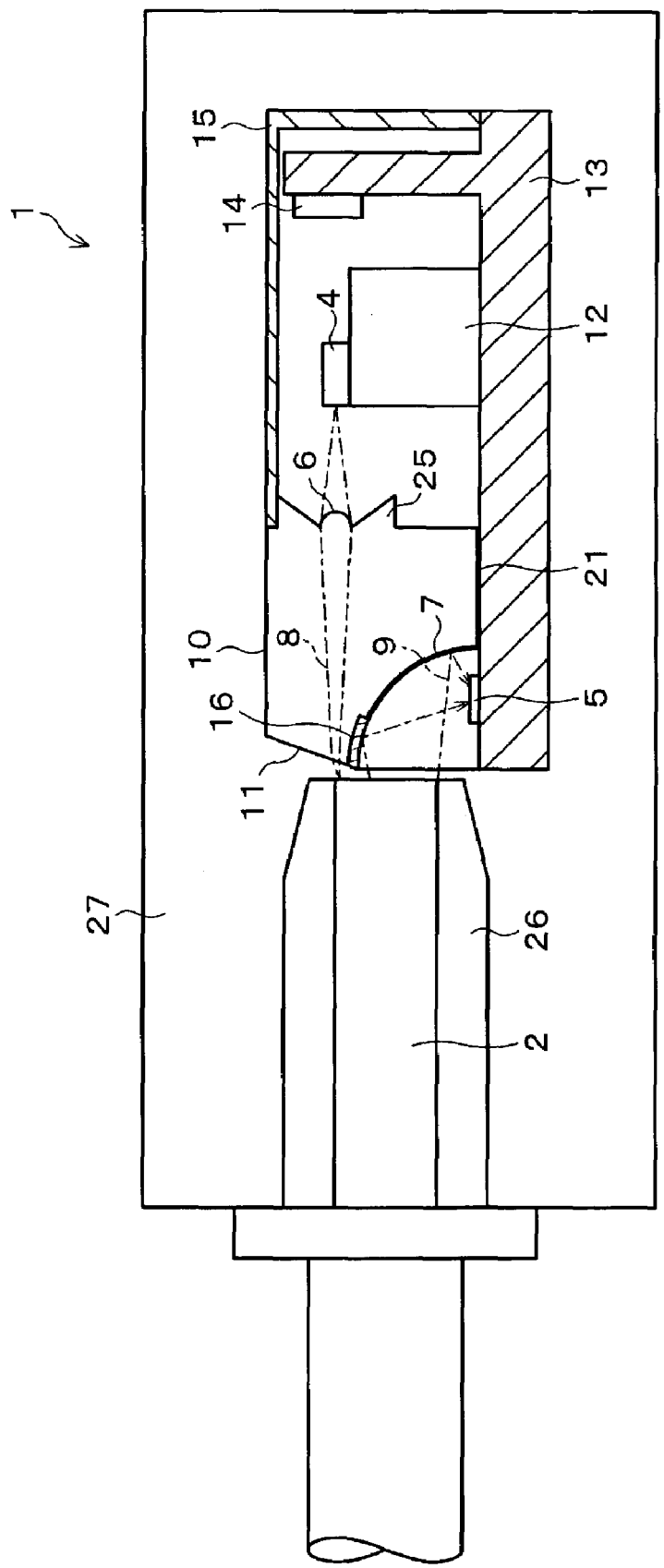
FIG. 2 is a cross-sectional view showing an embodiment of a bidirectional optical communications module in accordance with the present invention.

FIG. 2 shows a bidirectional optical communications module of an embodiment in accordance with the present invention. To the bidirectional optical communications module 1 is connected an optical fiber 2 which is an optical communications path element. An optical fiber plug 26 is used to attach and secure the front end of the optical fiber 2 to the bidirectional optical communications module 1, so that the optical fiber plug 26 forms at least part of an end face of an optical communications path element. The optical fiber 2 is optically coupled to the bidirectional optical communications module 1 by inserting the front end of the optical fiber 2 into a concavity in a receptacle 27 which is part of the bidirectional optical communications module 1.

The bidirectional optical communications module 1 includes a light-emitting device 4, a light-receiving device 5, a transmission lens 6 which is a first outgoing light control section, a reflection mirror 7 which is an incoming light control section, an optical member 10, a prism 11, a sub-mount 12, a stem 13, a monitoring photodiode 14, a transmitting section cover 15, a light-blocking section 16, a electrode 21, a diverging area 25, and a receptacle 27.

The light-receiving device 5, the optical member 10, the electrode 21, the sub-mount 12, and the monitoring photodiode 14 are placed on the stem 13 in individual positions. The stem 13 is electrically connected to a circuit (not shown).

Further, the transmission lens 6, the diverging area 25 which is a second outgoing light control section, the electrode 21, and the reflection mirror 7 which is an incoming light control section are disposed on the optical member 10. Further, the reflection mirror 7 is mounted opposite the optical fiber plug 26 to receive incoming beams of light having exited the optical fiber 2. Further, on top of the reflection mirror 7 is there provided room for transmit first outgoing beams 8 which are beams from the light-emitting device 4 to be transmitted. The reflection mirror 7 also serves to shield beams traveling from the light-emitting device 4 side toward the light-receiving device 5.

Further, the optical axis of the optical fiber 2 is parallel to the middle line of the light emitted by the light-emitting device 4. The optical axis of the transmission lens 6 is identical to the middle line of the light emitted by the light-emitting device 4. In other words, the optical axis of the optical fiber 2, the middle line of the light emitted by the light-emitting device 4, and the optical axis of the transmission lens 6 are parallel to one another. Providing the light-emitting device 4, the light-receiving device 5, and the optical member 10 parallel to the optical axis of the optical fiber 2 on the stem 13 alone in this manner is advantageous in that the bidirectional optical communications module 1 is easily assembled.

In the present embodiment, as mentioned earlier, the light-emitting device 4, the light-receiving device 5, and the optical member 10 are disposed mutually parallel to the optical axis of the optical fiber 2; they may be however disposed not parallel. For example, by tilting the optical axis of the light-emitting device 4 with respect to the optical axis of the optical fiber 2, light emitted by the light-emitting device 4 can be prevented from being reflected off the optical fiber 2 and returning to the light-emitting device 4, so as to stabilize oscillation of the light-emitting device 4.

The light-emitting device 4 is disposed on the sub-mount 12. The light-emitting device 4 generates outgoing light which is modulated according to a data signal. The light generated by the light-emitting device 4 diverges radially according to the angle of radiation of the light-emitting device 4. The divergent light is then converted to a given numerical aperture and collected by the transmission lens 6. The collected light passes through the optical member 10 as the first outgoing beams 8. The first outgoing beams 8 pass through the prism 11 and coupled to the optical fiber 2.

The sub-mount 12 is made of a material, such as silicon carbide (SiC), which has excellent heat dissipating nature. The light-receiving device 5 receives incoming beams 9 having exited the optical fiber 2. The transmission lens 6 collects light emitted by the light-emitting device 4 and couple the first outgoing beams 8 to the optical fiber 2. The diverging area 25 diverges part of the light emitted by the light-emitting device 4 (second outgoing beams) to reduce interference due to internal scattering and near end reflection. The optical member 10 includes the prism 11 tilted with respect to the optical axis of the optical fiber 2. The prism 11 is located on the plane through which the first outgoing beams 8 exit and refracts the first outgoing beams 8. After the refraction, the first outgoing beams 8 enter the optical fiber 2.

The incoming beams 9 having exited the optical fiber 2 are reflected off a first face of the reflection mirror 7 (incoming light control section). The reflection mirror 7 has curvature which is specified so that the reflection mirror 7 is able to collect the incoming beams 9 so as to couple the collected light to the light-receiving device 5. In the present embodiment, the curvature of the reflection mirror 7 is R=2.2 mm.

Figure 20:
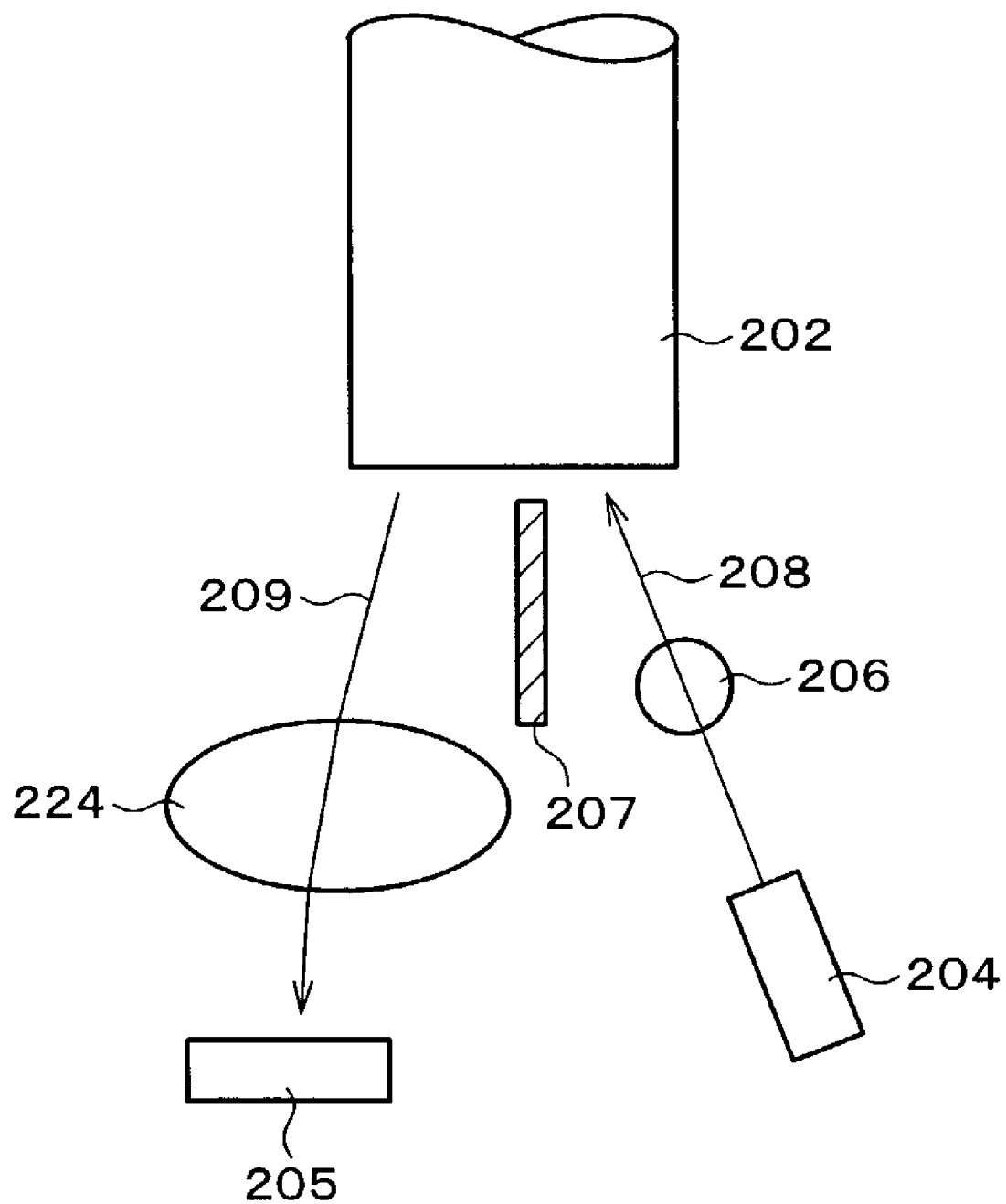
FIG. 20 is a plan view showing another arrangement example of conventional bidirectional optical communications modules.

Further, the reflection mirror (incoming light control section) 7 is a reflective thin film. That is, the thin film (reflection mirror 7) is thinner than the light-block plate 207 in FIG. 20. Constructing the reflection mirror (incoming light control section) 7 from such a thin film greatly reduces loss due to the thickness of the thin film.

It is preferred if the (inner) surfaces of the stem 13, the transmitting section cover 15, and the receptacle 27 are black or of another color which reduces excess scattering of light by absorbing a large percentage of light.

When the first outgoing beams 8 and the incoming beams 9 are spatially separated with respect to the diameter of the optical fiber 2 as shown in FIG. 2, some of the incoming beams 9 exit the optical fiber 2 through the same positions as the first outgoing beams 8 enter the optical fiber 2. Those incoming beams 9 however are not coupled to the light-receiving device 5. Considering such incoming beams 9 which exit through the same positions as the first outgoing beams 8 enter, a smaller part of the cross-sectional area of the optical fiber normal to the optical axis should be used for the first outgoing beams 8 entering the optical fiber 2. Further, to reduce that area used for the first outgoing beams 8 entering the optical fiber 2, an arrangement should be made so that the first outgoing beams 8 enter the optical fiber 2 near the periphery of the optical fiber 2. As described in the foregoing, a reduction in the area used for the first outgoing beams 8 entering the optical fiber 2 results in a reduction of the incoming beams 9 exiting through the same positions as the first outgoing beams 8 enter, i.e., a reduction of the incoming beams 9 not coupled to the light-receiving device 5. As a result, the incoming beams 9 can be coupled efficiently to the light-receiving device 5.

Further, the reflection mirror (incoming light control section) 7 is provided, on a part of a surface thereof opposite to a surface where the incoming beams 9 are received, with the light-blocking section 16. Note that the surface where the incoming beams are received refers to a first face of an incoming light control section. Further, a surface opposite to a surface where incoming beams are received refers to a second face of an incoming light control section.

The light-blocking section 16 is located in contact with or close to the optical fiber 2. The light-blocking section 16 serves to block light which has been reflected off an end face of the optical fiber (optical communications path element) 2, so as to prevent light which has been reflected off an end face of the optical fiber 2 from being coupled to the light-receiving device 5. The blocking of light enables prevention of interference due to near end reflection.

Note here that the light-blocking section 16 is designated as a part of the reflection mirror 7. In other words, an area of the second face of the reflection mirror 7 which is close to the optical fiber 2 is termed the light-blocking section 16. Further, the light-blocking section 16 may be provided differently, as a separate member from the reflection mirror 7. That is, the light-blocking section 16 may be provided, as a separate member, on an area of the second face of the reflection mirror 7 which is close to the optical fiber 2. Moreover, the light-blocking section 16 which is a separate member may be made of, for example, the same material as the reflection mirror 7. Further, the light-blocking section 16 which is a separate member may be made of, for example, a material selected suitably as a material for the light-blocking section 16, rather than for the reflection mirror 7.

Figure 3:
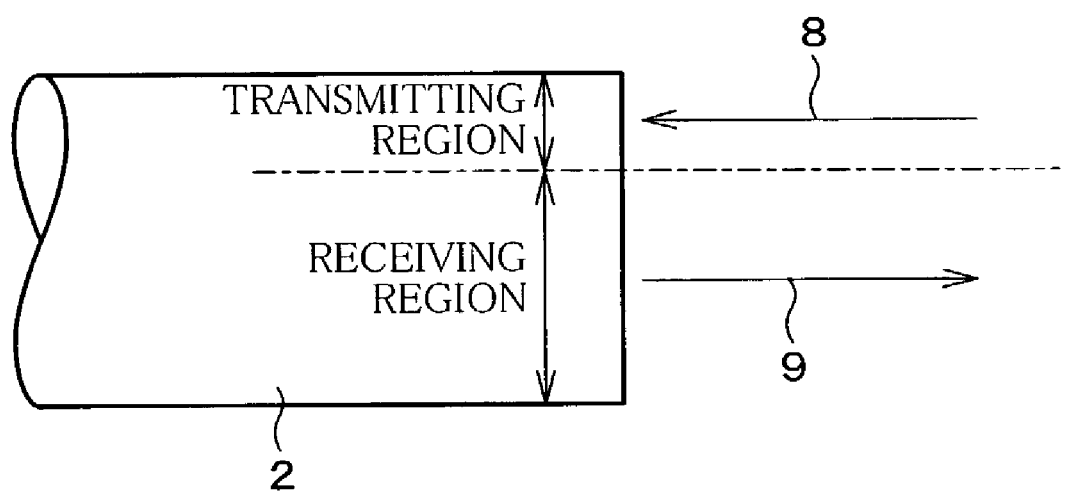
FIG. 3 is a plan view showing a transmitting region and a receiving region of a bidirectional optical communications module in accordance with the present invention.

When the single optical fiber 2 is used to spatially separate incoming and outgoing transmission light, as shown in FIG. 3, a decrease in the transmitting region in which the first outgoing beams 8 are coupled to the optical fiber 2 results in an increase in the receiving region; an increase in the receiving region results in an increase in available incoming beams 9. As a result, an efficient bidirectional optical communications module 1 can be achieved.

As described in the foregoing, it is important in obtaining an efficient bidirectional optical communications module 1 to devise a way to separate the first outgoing beams 8 and the incoming beams 9 with a minimum loss of light. The use of the light-block plate 207 as in FIG. 20 increases the loss due to the thickness of the light-block plate 207 and the spatial separation of the transmitting and receiving regions. In other words, if the thickness of the light-block plate 207 in FIG. 20 increases, the incoming beams 209 are all the more blocked by the light-block plate 207, leaving fewer of the incoming beams 209 being coupled to the light-receiving device 205. Moreover, the light-block plate 207 in FIG. 20 forms the transmitting region and the receiving region shown in FIG. 3. Therefore, the incoming beams 209 exiting the transmitting region are not coupled to the light-receiving device 205. However, according to the scheme presented in the present embodiment, the incoming and outgoing transmission light is separated by the thin film reflection mirror 7. Therefore, the loss due to the thickness of the thin film can be in practice reduced to zero.

In the present embodiment, the first outgoing beams 8 are refracted by the prism 11 and pass very close to the reflection mirror 7. Moreover, the first outgoing beams 8 enter the optical fiber 2 from the direction of the periphery of the optical fiber 2 (the direction of the periphery of the optical communications path). As a result, the transmitting region can be reduced. A reduction in the transmitting region results naturally in an increase in the receiving region which in turns results in an increase of the available incoming beams 9. As a result, an efficient bidirectional optical communications module 1 can be achieved.

Figure 4:
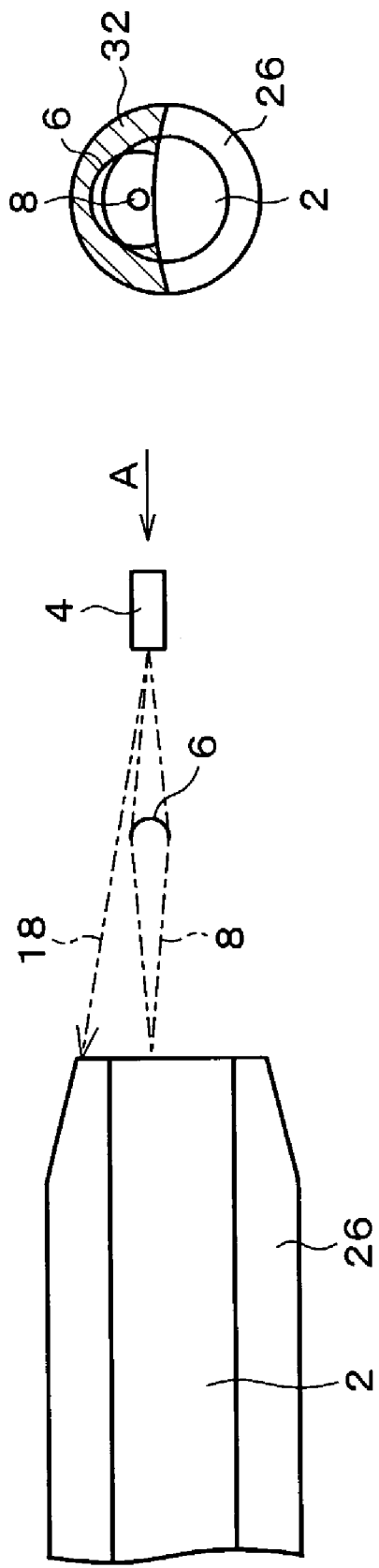
FIG. 4(*a*) is a plan view showing an optical path when there is no diverging area in a bidirectional optical communications module in accordance with the present invention, and FIG. 4(*b*) is a plan view showing the optical path in FIG. 4(*a*) as viewed from direction A.
Figure 4:
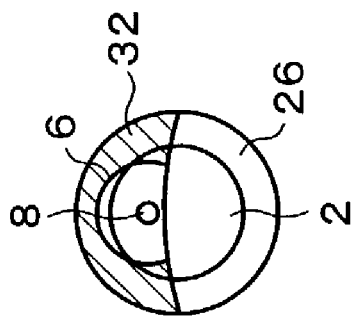

Next, reducing internal scattering will be described in reference to FIG. 4(*a*) to FIG. 8(*b*). When an optical fiber is used for inter-electronics communications, the amount of outgoing beams is set to a low value with safety (eye safety) taken into consideration. However, with a reduced output power of the semiconductor laser, satisfactory levels of light-off ratio and duty ratio are not available. Therefore, part of light needs to be cut off by the transmission lens 6. The transmission lens 6, as shown FIG. 4(*a*), collects part of the light radiating the light-emitting device 4 to form the first outgoing beams 8. Meanwhile, part of the light radiating from the light-emitting device 4 which passes the periphery of the transmission lens 6 (second outgoing beams) is cut off as stray light 18.

The light cut off by the transmission lens 6 (the light having passed through the periphery of the transmission lens 6) becomes the stray light 18 and is scattered in the bidirectional optical communications module 1. In the case of the structure in FIG. 4(*a*), part of the stray light 18 illuminates the optical fiber 2 or the optical fiber plug 26. FIG. 4(*b*) shows the arrangement in FIG. 4(*a*) as viewed from direction A. FIG. 4(*b*) is partially hatched. Part of the stray light 18 illuminates parts of the optical fiber 2 or the optical fiber plug 26 which are shown by hatching 32. Further, the part of the stray light 18 hitting the hatched part 32 reflects toward the reflection mirror 7. Therefore, it is difficult to separate from the incoming beams 9. Moreover, the stray light 18 becomes readily coupled to the light-receiving device and a cause for interference due to internal scattering.

Figure 5:
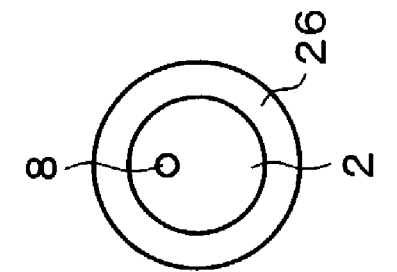
FIG. 5(*a*) is a plan view showing an optical path of light passing through a diverging area when there is a diverging area in a bidirectional optical communications module in accordance with the present invention, and FIG. 5(*b*) is a plan view showing the optical path in FIG. 5(*a*) as viewed from direction B.
Figure 5:
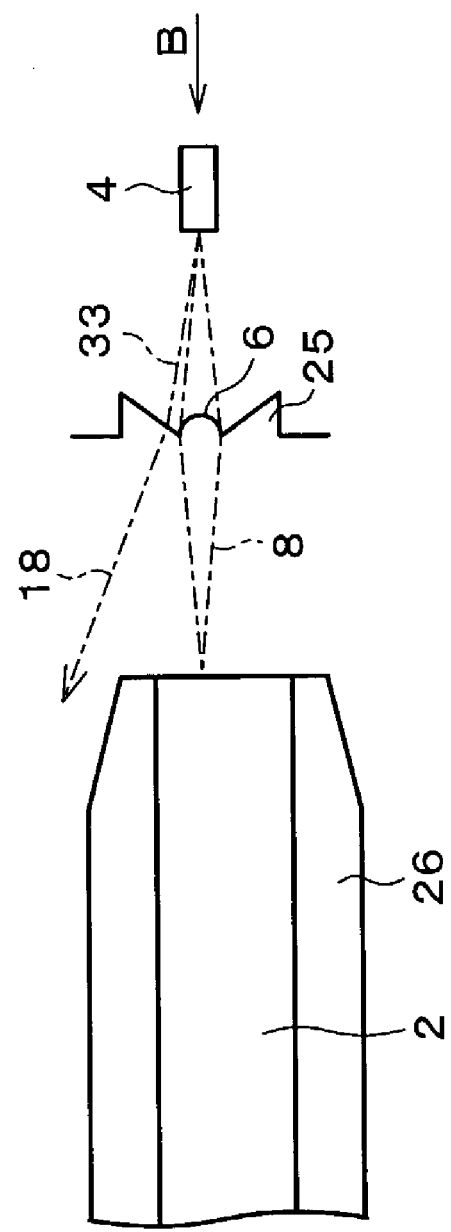

To control the stray light, in the present embodiment, the diverging area 25 is formed surrounding the transmission lens 6 as shown in FIG. 5(*a*). Further, FIG. 5(*b*) shows the arrangement in FIG. 5(*a*) as viewed from direction B. The diverging area (second outgoing light control section) 25 changes the direction of the stray light 18 if the second outgoing beams 33 enter. Note that the second outgoing beams 33 are beams of light before the diverging area 25 renders the second outgoing beams 33 the stray light 18. Put it differently, the second outgoing beams 33 are yet to be rendered the stray light 18 and travel toward the diverging area 25. Further, the diverging area 25 changes the direction of the stray light 18 so that the stray light 18 does not hit neither the optical fiber 2 having an optical communications path located above the transmission lens 6 nor the optical fiber plug 26 corresponding to an end face of the optical communications path element, shown in FIG. 4(*a*) and FIG. 5(*a*). As a result, interference by internal scattering due to the stray light 18 is greatly reduced.

In preventing interference by internal scattering, it is preferred if an arrangement is made so that the stray light located below the transmission lens 6 in FIG. 4(*a*) or FIG. 5(*a*) does not hit members in the bidirectional optical communications module 1, the optical fiber 2, etc. To restrain the interference due to the stray light located below the transmission lens 6, the reflection mirror 7 as an incoming light control section can be used.

Next, the diverging area 25 will be described. The diverging area 25 is located on the periphery of the transmission lens 6. The diverging area 25 is for making clear the separation of the first outgoing beams 8 and the stray light 18 and controlling the stray light 18. The diverging area 25 is positioned, especially, to prevent the light passing through the periphery of the transmission lens 6 from becoming the stray light 18 and the stray light 18 from hitting the optical fiber 2 or the optical fiber plug 26. By so positioning the diverging area 25, the incoming beams 9 and the stray light 18 are easily separated.

Figure 6:
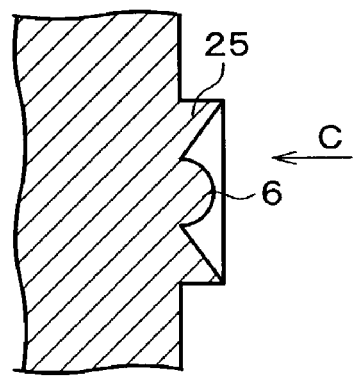
FIG. 6(*a*) is a cross-sectional view showing an arrangement of a diverging area of a bidirectional optical communications module in accordance with the present invention.
Figure 6:
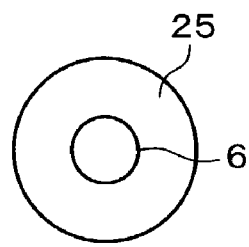
Figure 8:
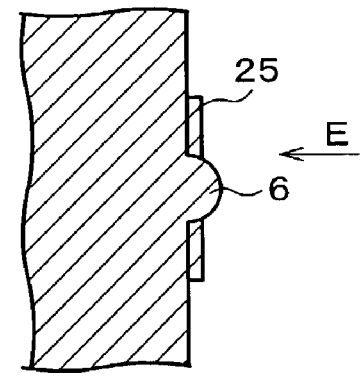
FIG. 8(a) is a cross-sectional view showing a further arrangement of a diverging area of a bidirectional optical communications module in accordance with the present invention.
FIG. 8(b) is a plan view showing the arrangement in FIG. 8(a) as viewed from direction E.
Figure 8:
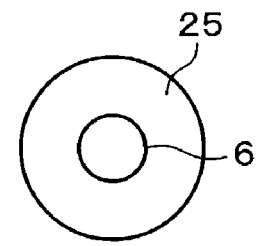

FIG. 6(*a*) to FIG. 8(*b*) show examples of the diverging area 25. FIG. 6(*a*) to FIG. 8(*b*) show examples in which the diverging area 25 (second outgoing light control section) is formed continuously from the periphery of the transmission lens 6 (first outgoing light control section).

As shown in FIG. 6(*a*) and FIG. 6(*b*), the diverging area 25 (second outgoing light control section) can be made in a prism shape formed continuously from the periphery of the transmission lens 6. FIG. 6(*a*) is a cross-sectional view showing an arrangement of a prism-shaped diverging area. FIG. 6(*b*) is a plan view showing the arrangement in FIG. 6(*a*) as viewed from direction C. Further, the diverging area 25 in FIG. 6(*a*) and FIG. 6(*b*) is a prism shape example showing the transmission lens 6 being placed in the center of a conical dent carved out on a cylinder.

Figure 7:
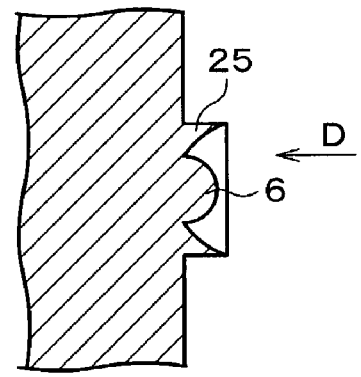
FIG. 7(a) is a cross-sectional view showing another arrangement of a diverging area of a bidirectional optical communications module in accordance with the present invention.
FIG. 7(b) is a plan view showing the arrangement in FIG. 7(a) as viewed from direction D.
Figure 7:
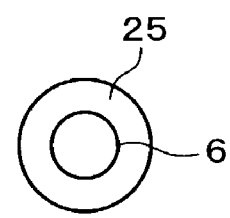

FIG. 7(*a*) is a cross-sectional view showing an arrangement of a lens-shaped diverging area 25 (second outgoing light control section). FIG. 7(*b*) is a plan view showing the arrangement in FIG. 6(*a*) as viewed from direction D. As shown in FIG. 7(*a*) and FIG. 7(*b*). the diverging area 25 can be made in a lens shape formed continuously from the periphery. The diverging area 25 in FIG. 7(*a*) and FIG. 7(*b*) is a lens shape example showing the transmission lens 6 being placed in the center of a hemispheric dent carved out on a cylinder. These diverging areas 25 refract the light which has exited the light-emitting device 4 and then passes through the periphery of the transmission lens 6 in the direction of the periphery. The refraction prevents the stray light 18 from hitting the optical fiber 2 or the optical fiber plug 26.

The diverging area 25 facilitates the separation of the first outgoing beams 8 and the stray light 18 by means of refraction. Moreover, the prism angle and the lens curvature can be altered according to the positions of the light-emitting device 4 and the optical fiber 2, so as to prevent the stray light 18 from hitting the optical fiber 2 or the optical fiber plug 26. In other words, the prism angle and the lens curvature are arbitrarily selectable for easy optimization.

Further, FIG. 8(*a*) and FIG. 8(*b*) show a diverging area 25 (second outgoing light control section) which blocks light shining the periphery of the transmission lens 6. FIG. 8(*a*) is a cross-sectional view showing an arrangement of a diverging area 25 which blocks light shining the periphery; FIG. 8(*b*) is a plan view showing the arrangement in FIG. 8(*a*) as viewed from direction E.

Such a diverging area 25 (second outgoing light control section) that blocks light shining the periphery of the transmission lens 6 absorbs or reflects the light passing through the periphery of the transmission lens 6. The absorption or reflection of light prevents the stray light 18 from hitting the optical fiber 2 or the optical fiber plug 26. The diverging area 25 depicted in FIG. 8(*a*) and FIG. 8(*b*) is normal to the optical axis of the light-emitting device 4; however, the diverging area 25 does not need to be normal to the optical axis of the light-emitting device 4. The diverging area 25 in FIG. 8(*a*) and FIG. 8(*b*) may be, for example, titled or curved. As the light-blocking material of the diverging area 25 depicted in FIG. 8(*a*) and FIG. 8(*b*), a light-reflecting material or a light-absorbing body is used. Light-reflecting materials, that is, high light-reflectance materials, are for example high light-reflectance metals, such as aluminum and gold, and the same material as used for the reflection mirror 7. Further, light-absorbing bodies are for example high light-absorbency paints.

By providing such a diverging area 25 (second outgoing light control section), the diverging area 25 can control the stray light 18 even if a lens with a small diameter is used as the first outgoing light control section. As a result, if a semiconductor laser is used as the light-emitting device, a bidirectional optical communications module which meets eye safety conditions can be achieved, even when the light-off ratio is made sufficiently large by keeping the output of the semiconductor laser sufficiently high.

Figure 9:
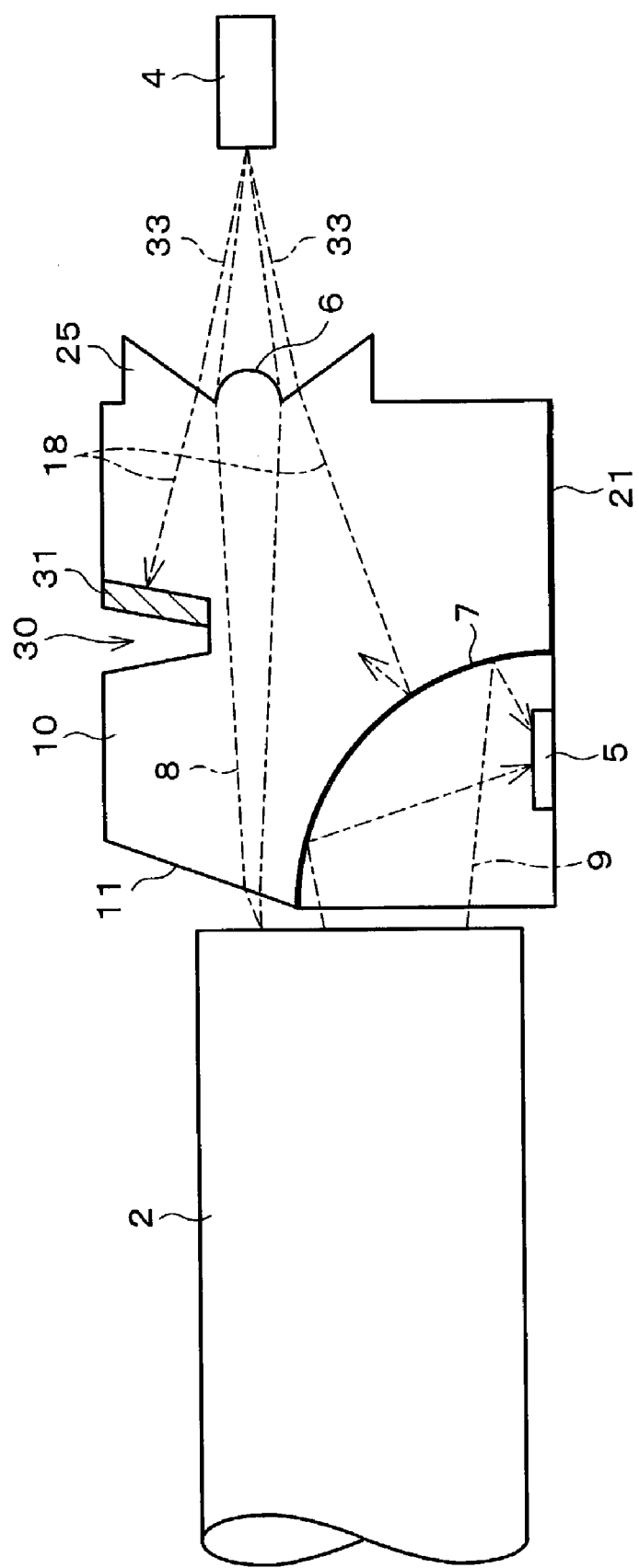
FIG. 9 is a plan view showing an arrangement in which a shield member is included in a bidirectional optical communications module in accordance with the present invention.

Further, FIG. 9 shows the bidirectional optical communications module 1 in which a shield section 30 is present. FIG. 9 is an example in which the shield section 30 (shield member) is positioned at a place hit by at least part of the light having passed through the diverging area 25 (second outgoing light control section) so as to absorb or reflect that hitting light.

The shield section 30 is positioned at a place through which the first outgoing beams 8 do not pass and which is hit by the light (stray light 18) having passed through the diverging area 25. Further, the shield section 30 has a light-absorbing layer (shield member) 31 with high light absorbency. The light-absorbing layer absorbs the stray light 18 as it is hit by the stray light 18. As a result, in the bidirectional optical communications module 1, less of the stray light 18 undergoes multiple reflections or scatterings before being coupled to the light-receiving device 5. Therefore, the shield section 30 and the light-absorbing layer 31 surely reduce interference due to internal scattering. As the light-absorbing layer 31, a substance painted with a high light-absorbency paint or a high light-absorbency material can be used. Further, a high-reflectance material may be placed in place of the light-absorbing layer 31 to reflect the stray light 18 in such a direction that the stray light 18 is not coupled to the light-receiving device 5.

The reflection mirror 7 reflects the stray light 18 as shown in FIG. 9. More specifically, the second face of the reflection mirror 7 (incoming light control section) reflects the stray light 18. In other words, the reflection mirror 7 prevents the stray light 18 from being coupled to the light-receiving device 5, thereby serving as a shield section.

As described in the foregoing, placing the diverging area 25 around the transmission lens 6 facilitates the separation of the first outgoing beams 8 and the stray light 18. Further, the stray light 18 can be easily prevented from being coupled to the light-receiving device 5 and causing interference due to internal scattering. Further, by placing the shield section 30, it becomes possible to more surely prevent interference due to internal scattering.

Further, the transmission lens 6 (first outgoing light control section) and the diverging area 25 (second outgoing light control section) can be integrally constructed from the same material. Moreover, the transmission lens 6 (first outgoing light control section), the diverging area 25 (second outgoing light control section), and the shield section 30 can be formed as an integral part of the optical member 10. The integral formation makes it possible to reduce the number of components and fabricate a more compact and less expensive bidirectional optical communications module 1.

In the present embodiment, the optical member 10 was fabricated using resin injection molding. Further, in the present embodiment, the inside of the optical member 10 has a resin-filled structure; however, an arrangement is possible where the optical member 10 is partially hollow.

Further, the shield section 30 or light-absorbing layer 31 may be formed on a face of the prism 11 which lies on the optical member 10, except for the region through which the first outgoing beams 8 pass. In other words, of the faces of the prism 11, the regions through which the first outgoing beams 8 pass may be left as part of the prism 11, and the shield section 30 or the light-absorbing layer 31 may be formed on the faces of the prism 11 corresponding to parts other than those passage regions. Note that the "parts other than the regions through which the first outgoing beams 8 pass" are alternatively termed those parts through which, of the light emitted by the light-emitting device 4, the light which is not transmitted to another party involved in the communications (other party) passes. Moreover, when the shield section formed on a face of the prism 11 is constructed of a high-reflectance material, the shield section 30 can be formed concurrently with the reflection mirror 7. Therefore, constructing the shield section 30 of a high-reflectance material on a face of the prism 11 facilitates the manufacturing process and is advantageous in terms of manufacturing cost.

Figure 10:
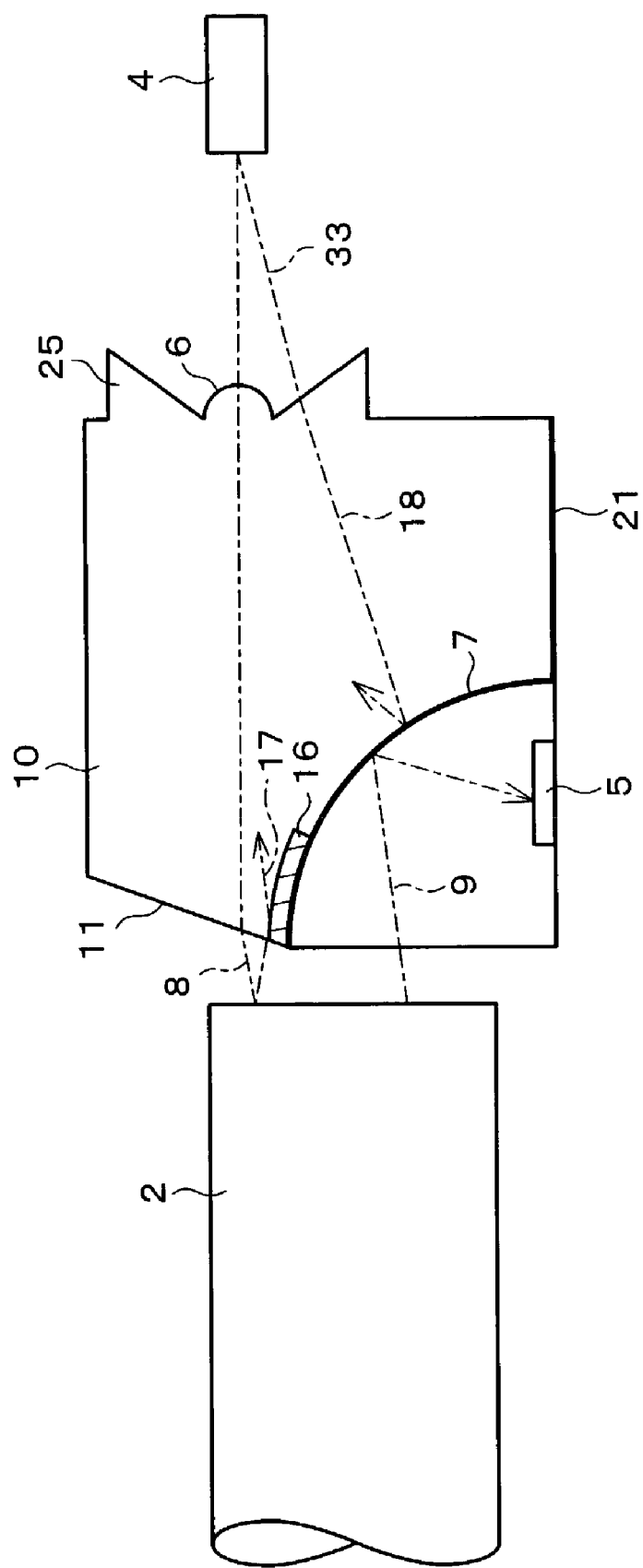
FIG. 10 is a plan view showing principles of interference prevention by a bidirectional optical communications module in accordance with the present invention.

Now, principles of the prevention of near end reflection and stray light will be described in reference to FIG. 10. The first outgoing beams 8 are refracted by the prism 11 in the optical member 10. Thereafter, the first outgoing beams 8 enter the periphery of the optical fiber 2. Upon the entering, reflection light 17 is generated. The reflection light 17 travel toward the center of the optical fiber 2.

The light-blocking section 16 is provided as a part of the reflection mirror 7 at the front end of the prism 11 in the optical member 10. Moreover, the light-blocking section 16 is positioned so as to come in contact with the optical fiber 2 or be separated from the optical fiber 2 by a distance of a few tens of micrometers to a few hundreds of micrometers. Further, the light-blocking section 16 is disposed on a face opposite to the face through which the incoming beams 9 enter the reflection mirror 7 (the second face of the incoming light control section). Hence positioned, the light-blocking section 16 reflects the reflection light 17. As a result, the reflection light 17 does not enter in the direction of the light-receiving device 5.

Further, a part of the light radiating from the light-emitting device 4 (second outgoing beams 33) passes through the diverging area 25 without entering the transmission lens 6 and becomes the stray light 18. As mentioned in the foregoing, the diverging area 25 is disposed so that the stray light 18 hits neither the optical fiber 2 nor the optical fiber plug 26. In other words, the diverging area 25 changes the traveling direction of the stray light 18 so that the stray light 18 passes beyond the periphery of the optical fiber 2 so as to prevent the stray light 18 from entering the reflection mirror 7 through its first face side from the optical fiber 2 side (left hand side of FIG. 10). As a result, the stray light 18 is prevented from being coupled to the light-receiving device 5.

Further, the reflection mirror 7 prevents the stray light 18 from entering the reflection mirror 7 through its inner side (first face side) from the opposite side to the optical fiber 2 side (right hand side of FIG. 10), i.e., the light-emitting device 4 side. The prevention is due to such disposition of the reflection mirror 7 as to completely cover the light-receiving device 5. More specifically, it is due to the stray light 18 hitting the opposite face to the face of the reflection mirror on which the light-receiving device 5 is provided. Note that the "opposite face to the face of the reflection mirror on which the light-receiving device 5 is provided" refers to the second face of the incoming light control section.

Further, with such an arrangement, unexpected stray light 18 does not enter the light-receiving device 5 even if the light-emitting device 4 is not correctly positioned due to assembly tolerance of the light-emitting device 4. To make the tolerance of the light-emitting device 4 highly precise, the assembly cost will be increased. However, according to the arrangement of the present embodiment, since the reflection mirror 7 is able to prevent unexpected stray light 18 from entering the light-receiving device 5, the assembly tolerance of the light-emitting device 4 can be raised accordingly. As a result, the assembly cost can be reduced. The light-emitting device 4 has typically an assembly tolerance of about a few tens of micrometers.

Further, the reflection light 17 also becomes stray light and is scattered in the bidirectional optical communications module 1. However, for a similar reason to the case of the stray light 18, the reflection light 117 is not coupled to the light-receiving device 5. That similar reason is that the reflection light 17 hits the second face of the reflection mirror (incoming light control section), that is, the opposite face to the face on which the light-receiving device 5 is positioned. In other words, the reflection mirror 7 acts to couple the incoming beams 9 to the light-receiving device 5 and also to optically separate the reflection light 17 and the stray light 18 from the light-receiving device 5.

The reflection mirror 7 can be fabricated by forming a thin film on the optical member 10. For example, a thin film of aluminum, etc. is made on the optical member 10 by vapor deposition. Since the reflection mirror 7 optically separates the light-receiving device 5, the position of the light-emitting device 4 can be determined without considering effects of the stray light 18. Possibilities of determining the position of the light-emitting device 4 in this manner has advantages that the bidirectional optical communications module 1 enjoys greater freedom in design and that the bidirectional optical communications module 1 allows easier adjustment in assembly.

Next, principles of the prevention of far end module reflection will be described in reference to FIG. 11. In the bidirectional optical communications module 1 of the present embodiment, the light which contributes to the production of far end module reflection is the following two types of light. Note that if the following two types of light are coupled to the optical fiber 2 again, interference occurs due to far end module reflection.

(1) Element reflection light 19, having been reflected off a surface of the light-receiving device 5.

(2) Prism reflection light 20, constituted by some of the incoming beams 9 exiting the optical fiber 2, which has been reflected off the optical member 10 (primarily, the prism 11).

First, treatment of the element reflection light 19 will be described. The light-receiving face of the light-receiving device 5 prevents the reflection of the incoming beams 9 by means of a reflection-preventing coating, thereby improving reception efficiency. A reflection prevention coating is, for example, a silicon nitride thin film. However, not all of the incoming beams 9 hit the light-receiving face. Some of the incoming beams 9 hit, and are reflected off, something but the light-receiving face, causing far end module reflection. For these reasons, a reflection-preventing coating is formed on parts other than the light-receiving face. The formation of a reflection-preventing coating on parts other than the light-receiving face in this manner surely restrains far end module reflection. The "reflection-preventing coating" has a high light absorbency in the wavelength region used and is arranged from a low reflectance material, for example, a black colored resist.

Next, treatment of the prism reflection light 20 will be described. By optimizing the tilt angle of the prism 11, the prism reflection light 20 can be prevented from being coupled even if the prism reflection light 20 enters the optical fiber 2. That is, it is sufficient if the tilt angle of the prism 11 is so optimized that the prism reflection light 20 enters the optical fiber 2 at a greater angle than the numerical aperture of the optical fiber 2. To this end, it is sufficient if the tilt angle of the prism 11 with respect to the optical axis of the optical fiber 2 is set approximately to the NA of the optical fiber 2 or greater. For example, if a NA=0.3 optical fiber 2 is to be used, the tilt angle of the prism 11 is equal to or greater than 10 degrees, preferably equal to or greater than 17 degrees. Note that the "tilt angle of the prism 11" refers to the angle between the prism 11 and the axis normal to the optical axis of the optical fiber 2 in FIG. 11. However, if an increase of the tilt angle of the prism 11 results in an increase of the incident angle of the first outgoing beams 8 to the optical fiber 2, which as a result can lead to a reduction of coupling loss of the first outgoing beams 8 or oscillation only in high modes. Therefore, these factors need to be taken into account to specify an optimum tilt angle of the prism.

Figure 12:
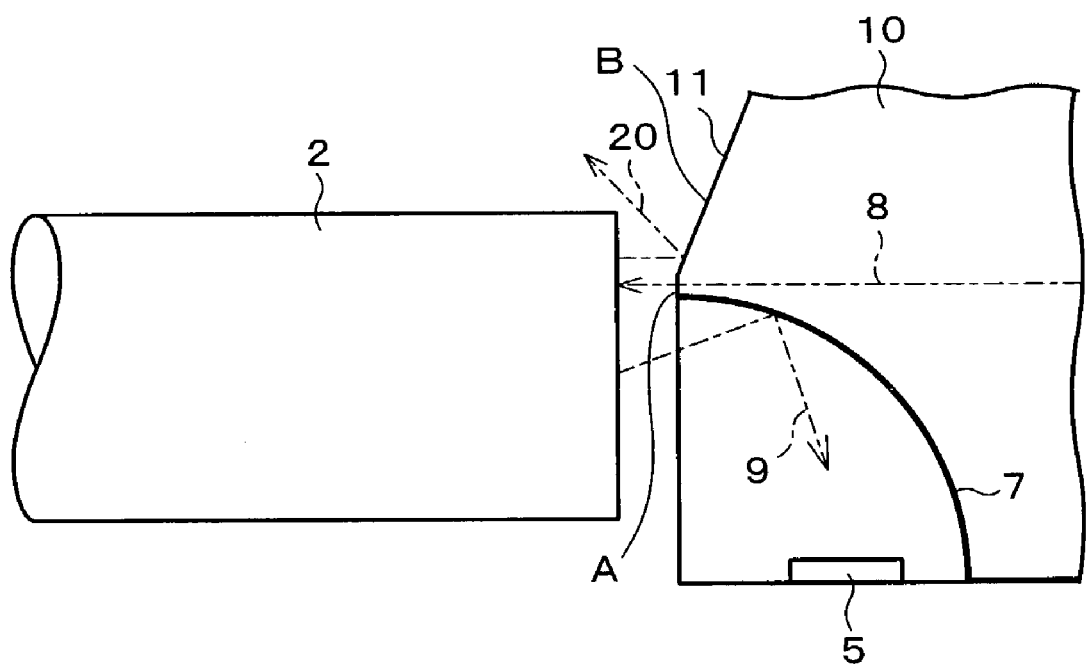
FIG. 12 is a plan view showing an arrangement example, in which a prism has a different shape, of a bidirectional optical communications module in accordance with the present invention.

Further, the prism reflection light 20 may be treated as shown in FIG. 12: the prism 11 is not formed on parts through which the first outgoing beams 8 pass (indicated by A in the figure) and the prism 11 is formed with a large tilt angle on parts through which the first outgoing beams 8 do not pass (indicated by B in the figure). When this is the case, the prism reflection light 20, having been reflected off the parts where no prism 11 is formed, causes far end module reflection. However, far end module reflection can be reduced by sufficiently reducing the area of the parts where the prism is formed. Alternatively, the problem may be solved by reducing the tilt angle of the prism 11 of the parts through which the first outgoing beams 8 pass and increasing the tilt angle of the prism 11 of the parts through which the first outgoing beams 8 do not pass. In other words, two different tilt angles may be specified for the prism. Another solution may be to reduce the reflectance by providing a reflection prevention coating (AR (anti-reflection) coating) on a face of the optical member 10 which is hit by the incoming beams 9.

Next, far end reflection of the optical fiber 2 will be described. When the end face of the optical fiber 2 is normal (90 degrees) to the optical axis as shown in FIG. 2, the difference in refractive index between the optical fiber 2 and air causes far end reflection of about 4%. Note that the amount of far end reflection is an absolute amount of the amount of far end reflection and expresses the ratio of the amount of reflection light at the far end face of the optical fiber 2 to the amount of exiting light from the optical fiber 2 in percentage points.

Figure 13:
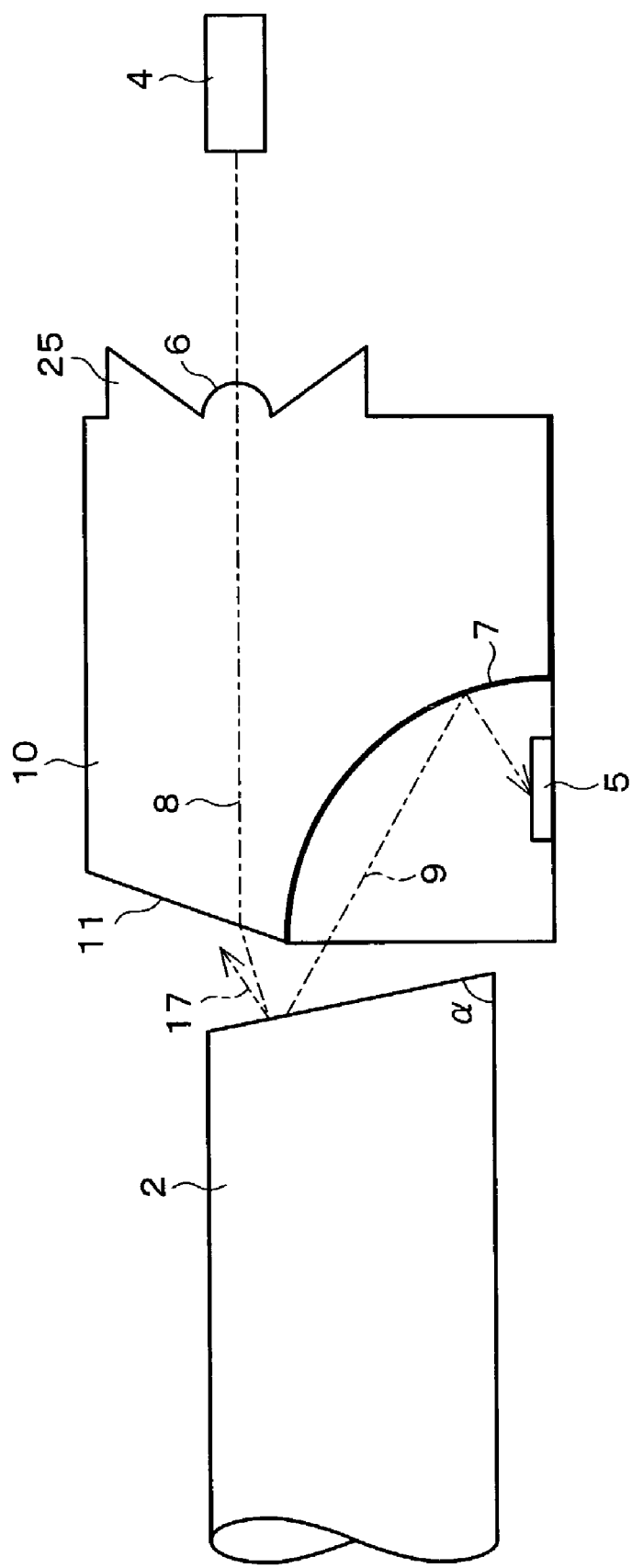
FIG. 13 is a plan view showing an arrangement of a tilted end face of an optical fiber for use with a bidirectional optical communications module in accordance with the present invention.
Figure 14:
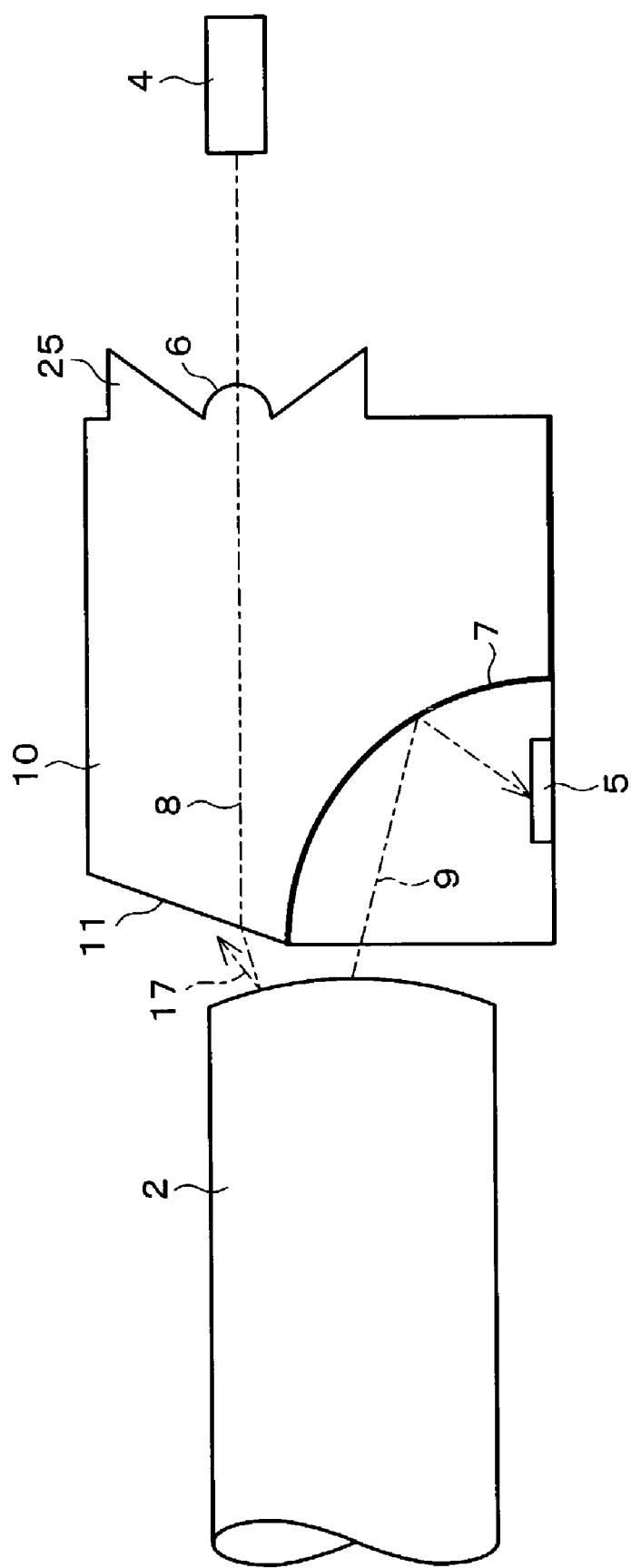
FIG. 14 is a plan view showing an arrangement of a spherical end face of an optical fiber for use with a bidirectional optical communications module in accordance with the present invention.

The far end reflection can be reduced by appropriately designing the profile of the end face of the optical fiber 2 (the profile of the end face of the optical communications path element). For example, as shown in FIG. 13, there is a method to tilting the end face of the optical fiber 2 (optical communications path element) with respect to the optical axis. Also, as shown in FIG. 14, there is a method to render the end face of the optical fiber 2 (optical communications path element) spherical.

Both of these methods alter the direction of light which undergoes far end reflection at the end face of the optical fiber 2 and render the angle of the reflection light equal to or greater than the numerical aperture of the optical fiber 2. By so doing, the light which has undergone far end reflection is prevented from being propagated in the optical fiber 2.

Note that these designs of the profile of the cross section of the optical fiber (optical communications path element) are applied suitably to, for example, plastic optical fiber (POF). As described in the foregoing, it is easy to fabricate POF in such a manner that it has a tilting end face or a spherical profile. For example, the end face can be fabricated by pressing it to a hot plate of a given profile so that it melts.

Next, an arrangement of the bidirectional optical communications module 1 will be described assuming that the profile of the end face of the optical fiber 2 has been changed as described in the foregoing.

FIG. 13 shows a case where an optical fiber 2 with a tilting end face is coupled to the bidirectional optical communications module 1. In this case, the side of the optical fiber 2 through which the first outgoing beams 8 enter is secured to the side of the optical fiber 2 where the cross section has an obtuse angle (the end face of the optical fiber 2 and an outer side face of the optical fiber 2 forms an obtuse angle), so as to couple to the bidirectional optical communications module 1. This positioning causes the reflection light 17, which is the reflection of the first outgoing beams 8 at the optical fiber 2, to reflect in the direction of the periphery of the optical fiber 2. As a result, interference due to near end reflection can be surely reduced. Further, the incoming beams 9 exiting the optical fiber 2 are refracted toward the light-receiving device side (the bottom in FIG. 13) by the tilt of the end face. Therefore, the refracted light travels in the direction of the reflection mirror 7, further improving reception efficiency.

Note that far end reflection can be surely reduced by specifying the tilt angle of the end face of the optical fiber 2 in accordance with the numerical aperture (NA) of the optical fiber 2. Specifically, the tilt angle is specified so that the light reflected at the end face of the optical fiber 2 is not propagated in the optical fiber 2. Most of the reflection light has an angle greater than NA with respect to the optical axis of the optical fiber 2. Therefore, by setting the tilt angle to an angle greater than the NA of the optical fiber 2, the light reflected at the end face of the optical fiber 2 is not propagated in the optical fiber 2, and far end reflection can be surely reduced. Nevertheless, if the tilt angle is too great, it becomes difficult to couple the first outgoing beams 8 to the optical fiber 2. Therefore, the tilt angle is determined so as not to inhibit the coupling of the first outgoing beams 8 into the optical fiber 2. When the tilt angle $\alpha$ of a NA=0.3 optical fiber 2 is set to 80 degrees, far end reflection was reduced to 0.4%. Note that when $\alpha$=90 degrees, far end reflection is 4%.

FIG. 14 shows a case where an optical fiber 2 with a spherical end face is coupled to the bidirectional optical communications module 1. When rendering the end face of the optical fiber 2 spherical, like in the case of tiling, there is no need to determine the direction of the optical fiber 2 with respect to the bidirectional optical communications module 1. Therefore, the optical fiber 2 can be easily plugged in and out without attending to direction. Causing the first outgoing beams 8 to enter an optical fiber 2 with an spherical end face near the periphery thereof, similarly to the case where the end face is tilted, the reflection light 17 reflects in the direction of the periphery of the optical fiber 2. As a result, interference due to near end reflection can be surely reduced. Moreover, some of the incoming beams 9 exiting the optical fiber 2 exit after being collected by a spherical end face of the optical fiber 2. Therefore, reception efficiency improves.

Figure 15:
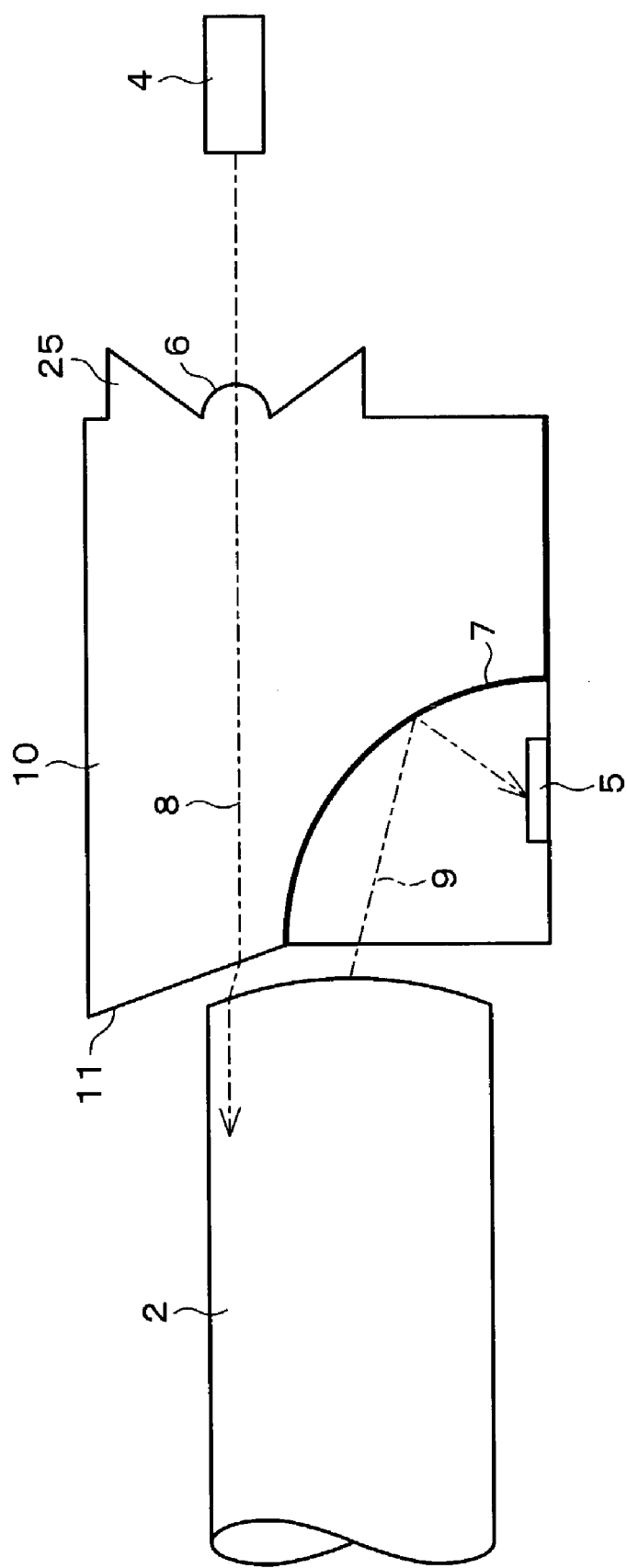
FIG. 15 is a plan view showing an arrangement example, in which a prism has a different shape, of a bidirectional optical communications module in accordance with the present invention.

Further, when the end face of the optical fiber 2 is tilted or spherical, the first outgoing beams 8 having entered the optical fiber 2 are refracted according to the profile of the end face. To raise coupling efficiency of the first outgoing beams 8 to the optical fiber 2, the angles of the refracted first outgoing beams 8 with respect to the optical axis of the optical fiber 2 needs to be reduced to a value smaller than the NA of the optical fiber 2. To satisfy the needs, as shown in FIG. 15, the tilted face of the prism 11 is preferably tilted in the opposition direction to that shown in FIG. 13 and FIG. 14. As described in the foregoing, by rendering the end face of the optical fiber 2 tilted or spherical, far end reflection is reduced, and reception efficiency can be improved.

Next, a method of preventing electrical and electromagnetic interference will be described. The stem 13 is connected to a ground electrode of the light-receiving device 5. The sub-mount 12 is formed using an insulator, such as silicon carbide (SiC). In other words, the light-emitting device 4 and the light-receiving device 5 electrically isolated. Further, the reflection mirror 7 is formed also below the optical member 10 (electrode 21). The electrode 21 electrically connects the stem 13 to the reflection mirror 7. That is, when viewed from the light-emitting device 4, the reflection mirror 7 and the stem 13 shield the light-receiving device 5. The shield restrains electromagnetic interference.

The reflection mirror 7 is formed by vapor deposition of a high-reflectance, conductive material. In the present embodiment, an aluminum reflection mirror 7 is used. The reflection mirror 7 of the present embodiment has a reflectance of about 90% (for wavelength of 650 nm). Note that as another material for the reflection mirror 7, for example, gold or another metal can be used. The reflection mirror 7, as shown in FIG. 2, is formed on the lower left-hand side of the optical member 10. When that reflection mirror 7 is formed, the electrode 21 is also formed concurrently. The reflection mirror 7 and the electrode 21 are provided across the face of the bottom side of the optical member 10 as shown in FIG. 2. Therefore, the reflection mirror 7 and electrode 21 can be formed easily without patterning by means of a mask, etc.

Further, the transmitting section cover 15 covers the light-emitting device 4 and the monitoring photodiode 14. The transmitting section cover 15 is attached to the optical member 10 and the stem 13 to seal the light-emitting device 4 against ambient air. The transmitting section cover 15 is also connected electrically to the stem 13. Owing to the connection, the transmitting section cover 15 serves to electromagnetically seal the light-emitting device 4 from outside.

Further, a part of the optical member 10 is used as a part of the sealing member of the light-emitting device 4 (corresponding to normal cover glass). The use contributes to reduction of components and their cost, as well as facilitation of manufacturing steps.

Next, the component members of the bidirectional optical communications module 1 shown in FIG. 2 will be described. As the optical fiber 2, it is preferred if, for example, POF or other multimode optical fiber is used. The core of the POF is made of an optically highly transmissive plastic, such as PMMA (polymethylmethacrylate) or polycarbonate. Further, the clad of the POF is constructed from a plastic of which the refractive index is lower than the core. The diameter of the core of such an optical fiber 2 can be easily expanded from about 200 μm to about 1 mm, when compared to quartz optical fibers. Due to the ease in fabrication, POF can be easily adjusted for coupling with the bidirectional optical communications module 1. Moreover, the bidirectional optical communications link 3 can be obtained at low cost using POF.

As depicted in the present embodiment, when the first outgoing beams 8 and the incoming beams 9 are to be spatially separated, it is preferred if a POF is used of which the diameter of the core is about 1 mm. Further, the POF may be replaced by PCF (Polymer Clad Fiber) having a core made of quartz glass and a clad made of polymer. PCF is more expensive than POF, but has a low transmission loss and wide transmission bandwidth. For these reasons, using PCF as the transmission medium makes it possible to obtain a bidirectional optical communications link 3 capable of long distance communications and high speed communications.

As the light-emitting device 4, a semiconductor laser or a light-emitting diode (LED) is used. The wavelengths of the light-emitting device 4 are preferably those which produces small transmission losses in the optical fiber 2 used. Considering manufacturing cost, those which result in a cheaper light-emitting device 4 are more preferably selected from these wavelengths. For example, when a POF is used as the optical fiber 2, a semiconductor laser with a 650 nm wavelength can be used, for example. Semiconductor lasers with a 650 nm wavelength are cheap, as they are mass produced for DVDs, etc.

In the back of the light-emitting device 4, the monitoring photodiode 14 is provided. The monitoring photodiode 14 serves to maintain the amount of light from the light-emitting device 4 at a constant value.

As the light-receiving device 5, a photodiode is used which is capable of converting the strength of a received modulated light into an electrical signal and which is highly sensitive in the wavelengths of the light-emitting device 4. Such photodiodes are, for example, PIN photodiodes made of silicon and avalanche photodiodes.

The optical member 10 is made of a plastic, such as PMMA or polycarbonate, by injection molding, for example. On the side of the optical member 10 which acts as the reflection mirror 7, an aluminum, gold, or similar high light-reflectance metal thin film is formed by, for example, vapor deposition.

The reflection mirror 7 is formed by vapor deposition from the bottom left-hand side of the optical member 10 in FIG. 2. Therefore, the reflection mirror 7 can be formed easily without patterning by means of a mask, etc. The reflection mirror 7 is curved and acts to collect the incoming beams 9. Further, the electrode 21 is formed on the bottom face of the optical member 10 which comes in contact with the stem 13.

The electrode 21 is formed concurrently with the reflection mirror 7 by vapor deposition, etc. Further, the electrode 21 is at least partially linked to the reflection mirror 7.

The optical member 10 is provided with the transmission lens 6 which collects and couples the first outgoing beams 8 to the optical fiber 2, the diverging area 25 which prevents interference due to stray light, and the prism 11 which refracts, and causes to enter the optical fiber 2, the first outgoing beams 8. Moreover, although not shown in figures, positioning pits and bumps for positioning the light-emitting device 4 and the light-receiving device 5 are formed on the optical member 10. Further, the optical member 10 is used also as a part of the sealing member for the light-emitting device 4. In this manner, the single optical member 10 has multiple functions; therefore, component members can be greatly reduced, and tolerance in assembly can be reduced, which enables a cheap, compact bidirectional optical communications module 1 to be obtained.

Moreover, on the single stem 13, the light-emitting device 4, the light-receiving device 5, and the optical member 10 can be disposed mutually parallel to the optical axis of the optical fiber 2. As a result, complex assembly steps are no longer necessary, and assembly steps can be greatly reduced.

As described in the foregoing, using the bidirectional optical communications module 1 detailed in the present embodiment makes it possible to prevent near end reflection, far end reflection, far end module reflection, and interference due to internal scattering. Moreover, using the bidirectional optical communications module 1 detailed in the present embodiment makes it possible to reduce electrical and electromagnetic interference too. Therefore, using the bidirectional optical communications module 1 of the present embodiment makes it possible to perform all dual mode bidirectional optical communications with the single optical fiber 2. Especially, forming the diverging area 25 around the transmission lens 6 makes it easy to separate the first outgoing beams 8 and the stray light 18. As a result, interference due to internal scattering can be surely reduced. Further, by enabling the single optical member 10 to function in various ways, a bidirectional optical communications module 1 can be achieved which is cheap, compact, and easily manufactured.

Embodiment 2

Figure 16:
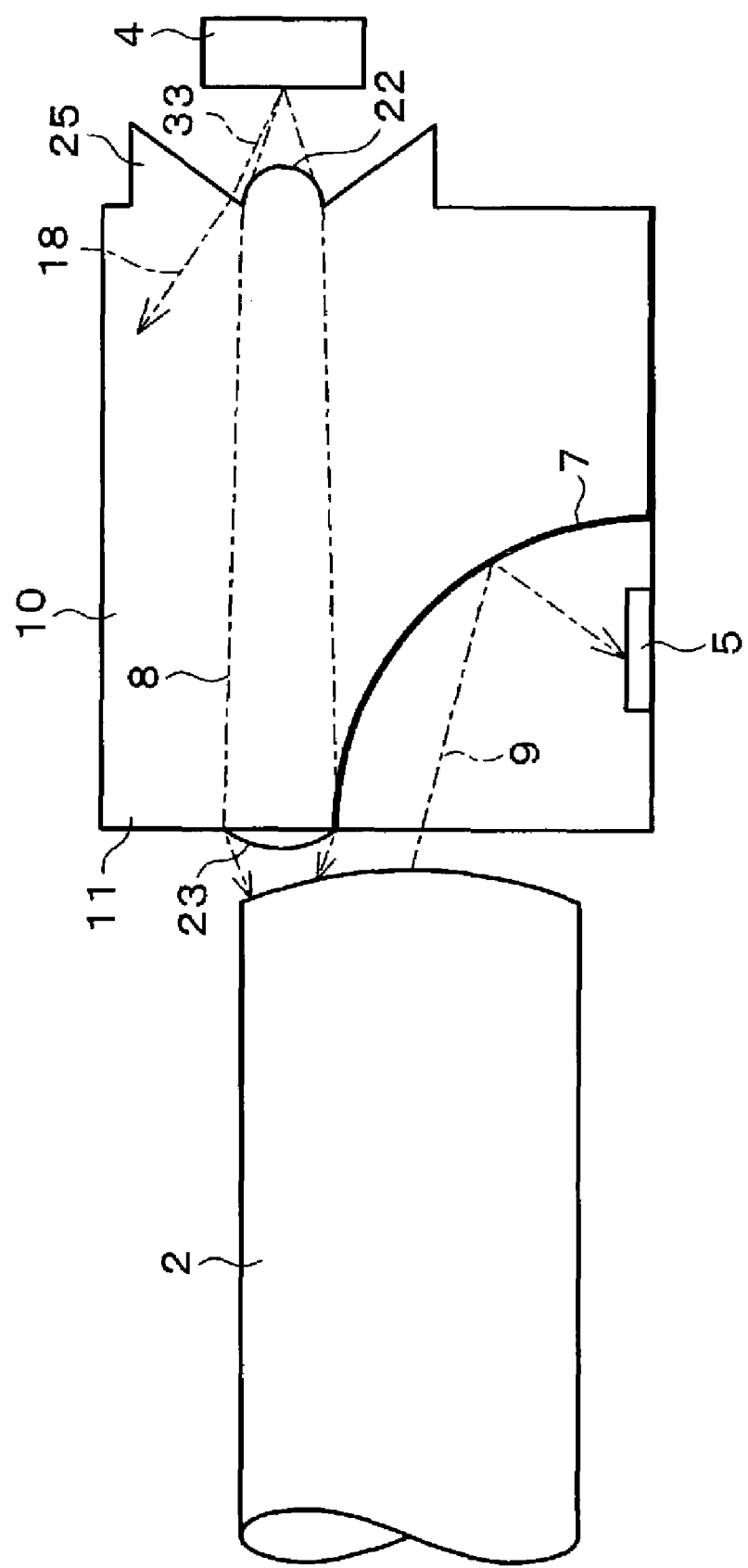
FIG. 16 is a plan view showing an arrangement of two transmission lenses of a bidirectional optical communications module in accordance with the present invention.

The following will describe another embodiment in accordance with the present invention in reference to FIG. 16. Here, for convenience, members of the present embodiment that have the same arrangement and function as members of embodiment 1, and that are mentioned in that embodiment are indicated by the same reference numerals and description thereof is omitted.

FIG. 16 shows a bidirectional optical communications module 1 having a first transmission lens 22 and a second transmission lens 23. FIG. 16 shows an example in which a first outgoing light control section includes multiple lenses. The arrangement including the first transmission lens 22 and the second transmission lens 23 as in FIG. 16 allows the use of a light-emitting diode (LED) or a surface-emitting device, such as a surface-emitting laser, as a light-emitting device 4.

The light exiting the light-emitting device 4 is collected by the first transmission lens 22 and passes through an optical member 10. Moreover, that light is collected by the second transmission lens 23 and coupled to an optical fiber 2.

The use of an LED as a light-emitting device 4 eliminates the needs for a costly drive circuit, unlike cases where a semiconductor laser is used as a light-emitting device 4. Therefore, the use of an LED as a light-emitting device 4 achieves a cheap bidirectional optical communications module 1.

However, in comparison to a semiconductor laser, an LED has a large angle of radiation and a large light-emitting area. Therefore, if an LED is used as a light-emitting device 4, the light-emitting device 4 and the transmission lens 6 need to be closely located to couple light to the transmission lens at high efficiency. However, since an LED has a large angle of radiation and a large light-emitting area, if the light-emitting part is closely located to the transmission lens 6, a problem arises that sufficient collection is impossible.

In the bidirectional optical communications module 1 of the present embodiment, using multiple lenses, i.e., the first transmission lens 22 and the second transmission lens 23, as the first outgoing light control section facilitates the collection of first outgoing beams 8 even when an LED is used as a light-emitting device 4. Moreover, as described in the foregoing, the use of the two transmission lens (first transmission lens 22 and second transmission lens 23) can improve transmission efficiency.

Figure 11:
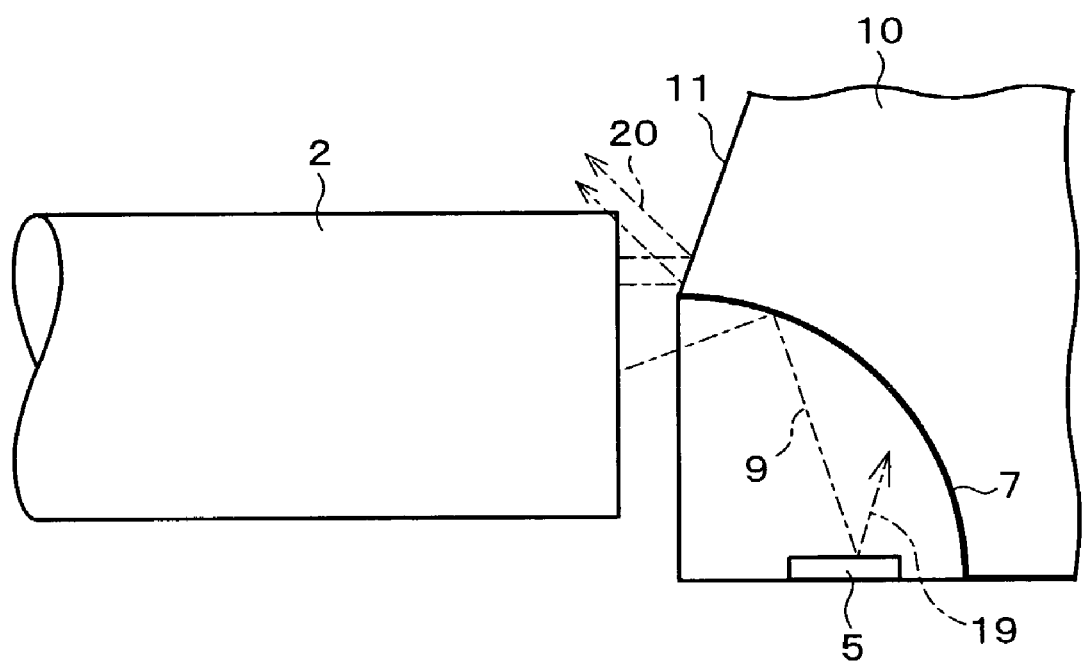
FIG. 11 is a plan view showing principles of far end module reflection prevention of a bidirectional optical communications module in accordance with the present invention.

In embodiment 2, no prism 11 as in FIG. 11 or 12 is provided as in embodiment 1. However, incoming beams 9 shone from the second transmission lens 23 diverge toward and reflected off the second transmission lens 23. Therefore, the second transmission lens 23 can prevent far end module reflection.

A diverging area 25 is formed on the periphery of the first transmission lens 22 as depicted in embodiment 1. The diverging area 25 separate light to stray light 18 and first outgoing beams 8. Moreover, the diverging area 25 prevents the stray light 18 from hitting the optical fiber 2 or the optical fiber plug 26.

Further, a diverging area which is similar to the diverging area 25 of embodiment 1 may be formed on the periphery of the second transmission lens 23 to prevent interference due to internal scattering: for example, a diverging area may be formed continuously to the periphery of the second transmission lens 23. Further, the diverging area may be arranged from, for example, a prism, a lens, or a high light-reflectance material.

As described in the foregoing, the use of the bidirectional optical communications module 1 depicted in embodiment 2 allows the use of a cheap LED and reliable prevention of interference due to internal scattering.

Embodiment 3

Figure 17:
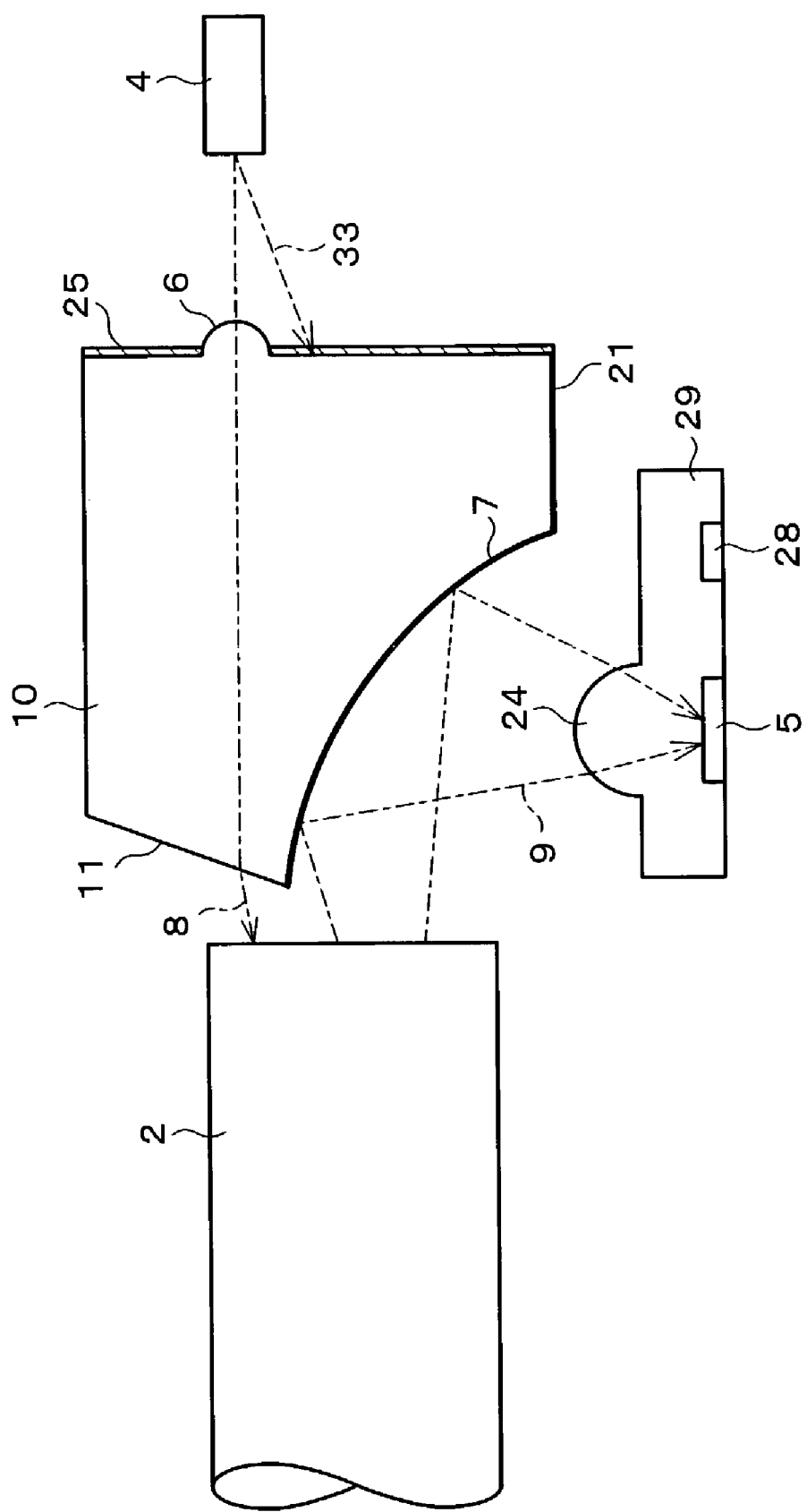
FIG. 17 is a plan view showing an arrangement of a reception lens mounted to a bidirectional optical communications module in accordance with the present invention.
Figure 18:
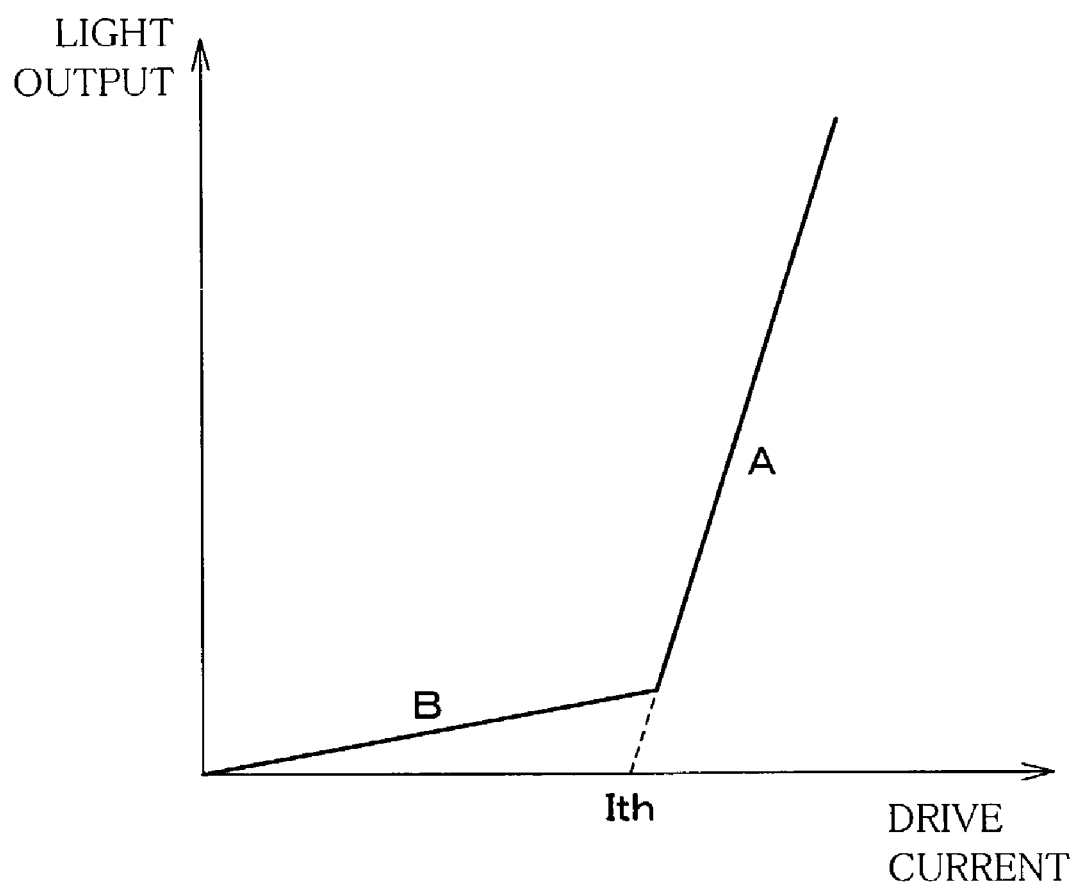
FIG. 18 is a graph showing a relationship between the drive current and the light output of a semiconductor laser.
Figure 19:
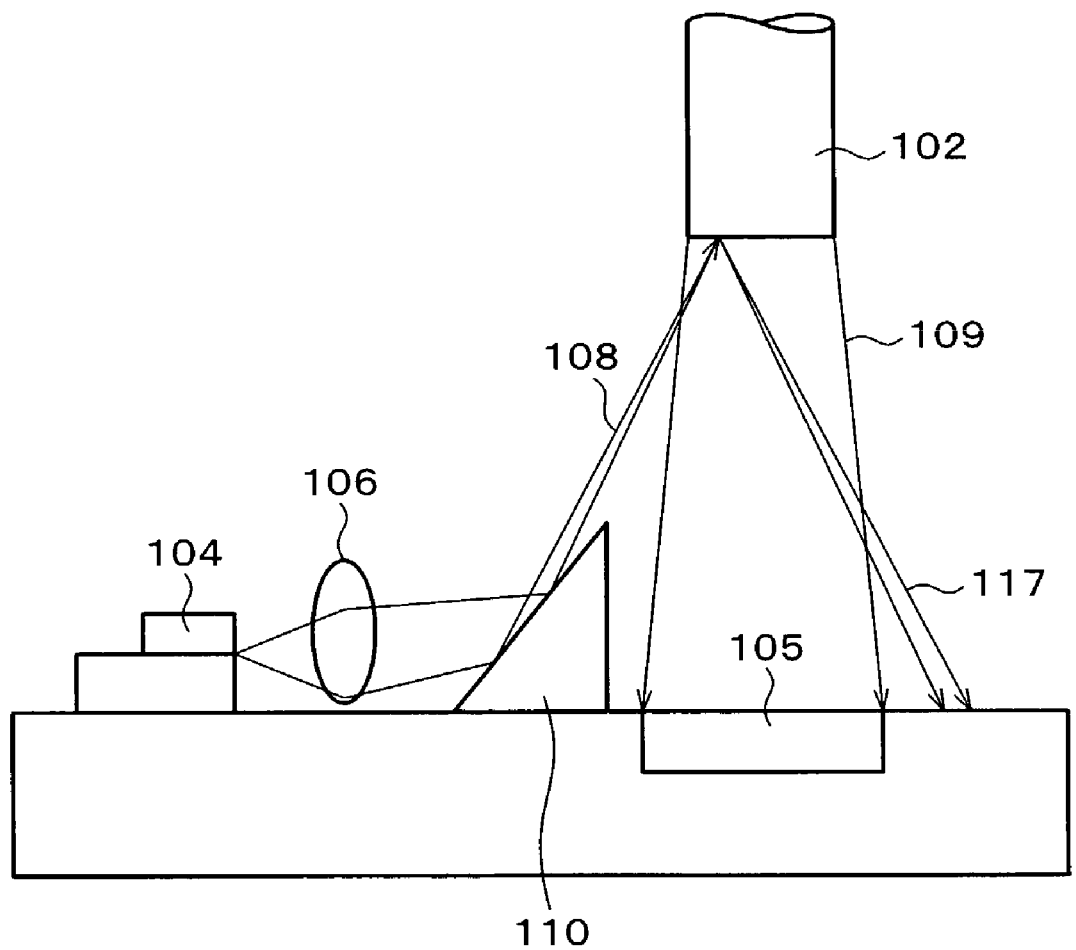
FIG. 19 is a plan view showing an arrangement example of conventional bidirectional optical communications modules.

The following will describe a further embodiment in accordance with the present invention in reference to FIG. 17. Here, for convenience, members of the present embodiment that have the same arrangement and function as members of embodiments 1, 2 and that are mentioned in those embodiments are indicated by the same reference numerals and description thereof is omitted.

FIG. 17 shows an example in which an incoming-beam-collecting reception lens is disposed between a reflection mirror 7 (incoming light control section) and a light-receiving device 5. In the present embodiment, an arrangement is employed where the incoming beams 9 collected by the reflection mirror 7 is further collected by the reception lens 24 to further improve reception efficiency.

The reception lens 24 is formed integrally with a mold section 29. The mold section 29 seals the light-receiving device 5 and a pre-amplifier 28 located nearby against ambient air. Note that the mold section 29 is made of a transparent resin, such as acryl or polycarbonate.

Sealing the light-receiving device 5 and the pre-amplifier 28 against ambient air prevents performance from degrading due to aging. Further, in comparison to the solo provision of the reception lens 24, the provision of the reception lens 24 to the mold section 29 renders the bidirectional optical communications module 1 relatively compact.

The diverging area 25 is formed on the periphery of the transmission lens 6. In the present embodiment, a light-blocking film is used as the diverging area 25. As the light-blocking film can be used for example a member in which a vapor deposition mirror is formed on the periphery of the transmission lens 6 as a reflection film, a member to which a high light-absorbency material is applied, etc. Similarly to embodiment 1 or 2, the diverging area 25 may be of course arranged from a prism or lens formed continuously to the periphery of the transmission lens 6.

As described in the foregoing, the bidirectional optical communications module 1 depicted in embodiment 3 has high reception efficiency and shows stable performance and is capable of surely preventing interference due to internal scattering.

Further, in addition to the above arrangement, a bidirectional optical communications module in accordance with the present invention may be arranged so that the second outgoing light control section is formed continuously to a periphery of the first outgoing light control section.

According to the arrangement, the second outgoing light control section is formed continuously to the periphery to the first outgoing light control section; the first outgoing light control section does not collect light and can control the light passing through its periphery. In other words, in addition to effects of the above arrangement, all light radiating from the light-emitting device can now be controlled by a simple arrangement.

Further, in addition to the above arrangement, a bidirectional optical communications module in accordance with the present invention may be arranged so that a shield member is provided at a position hit by at least part of light having passed through the second outgoing light control section so as to absorb the light hitting the position.

According to the arrangement, the shield member absorbs at least part of light having passed through the second outgoing light control section. As a result, less stray light undergoes multiple scatterings and is coupled to the light-receiving device in the bidirectional optical communications module. As a result, in addition to effects of the above arrangement, interference due to internal scattering can be reduced further.

Further, in addition to the above arrangement, a bidirectional optical communications module in accordance with the present invention may be arranged so that a shield member is provided at a position hit by at least part of light having passed through the second outgoing light control section so as to reflect the light hitting the position.

According to the arrangement, the shield member reflects at least part of light having passed through the second outgoing light control section. As a result, less stray light undergoes multiple scatterings and is coupled to the light-receiving device in the bidirectional optical communications module. As a result, in addition to effects of the above arrangement, interference due to internal scattering can be reduced further.

Further, in addition to the above arrangement, a bidirectional optical communications module in accordance with the present invention may be arranged so that the second outgoing light control section is arranged from a prism, lens, light-reflecting material, or light-absorbing body.

According to the arrangement, the second outgoing light control section is arranged from a prism, lens, light-reflecting material, or light-absorbing body. The prism and lens refract light that makes no contribution in transmission. The refraction makes clear the separation between outgoing light and stray light. Further, using a light-reflecting material reflects light and makes clear the separation between outgoing light and stray light. Moreover, using a light-absorbing body absorbs stray light and can reduce the absolute amount of light of stray light. As a result, in addition to effects of the above arrangement, interference due to internal scattering can be reduced further. Further, a prism is easy to adjust its angle, and a lens is easy to adjust its curvature. Therefore, they can be optimized easily for the separation between outgoing light and stray light. Further, the design engineer of the bidirectional optical communications module can employ as the second outgoing light control section a device which most suitably matches the bidirectional optical communications module.

Further, in addition to the above arrangement, a bidirectional optical communications module in accordance with the present invention may be arranged so that the first outgoing light control section and the second outgoing light control section are integrally formed of an identical material.

According to the arrangement, the first outgoing light control section and the second outgoing light control section are integrally formed of an identical material; the number of components can be reduced. As a result, in addition to effects of the above arrangement, an inexpensive, compact bidirectional optical communications module can be obtained which experiences little aging. Further, the prevention of increases of the number of components in this manner can facilitate the manufacturing process.

Further, in addition to the above arrangement, a bidirectional optical communications module in accordance with the present invention may be arranged so as to further include an incoming light control section including a first face and a second face which is an opposite face to the first face, the first face reflecting incoming light so as to collect the reflected incoming light to the light-receiving device, the second face reflecting light hitting the second face so as to prevent the light hitting the second face from hitting the light-receiving device.

According to the arrangement, the incoming light control section includes a first face and a second face which is an opposite face to the first face. Further, the first face reflects incoming light so as to collect the reflected incoming light to the light-receiving device. Moreover, the second face reflects light hitting the second face so as to prevent the light hitting the second face from hitting the light-receiving device. As a result, in addition to effects of the above arrangement, light other than the incoming light from the opposite side to the first face which is a receiving face is reflected, and the coupling of the light other than the incoming light to the light-receiving device can be reduced. In other words, a single incoming light control section, as provided in this manner, serves both as the first face to receive the incoming light and the second face reflecting the light hitting the second face. As a result, interference due to the coupling of the light other than the incoming light to the light-receiving device can be more easily reduced.

Further, in addition to the above arrangement, a bidirectional optical communications module in accordance with the present invention may be arranged so that a light-blocking section which blocks light having been reflected off the end face of the optical communications path element is provided on the second face of the incoming light control section.

According to the arrangement, a light-blocking section is provided on the second face of the incoming light control section. Therefore, the light reflected off the optical communications path element, for example, the reflection of the first outgoing light off the optical communications path element, can be blocked prevented from being coupled to the light-receiving device. Therefore, in addition to effects of the above arrangement, interference due to near end reflection can be more effectively reduced.

Further, in addition to the above arrangement, a bidirectional optical communications module in accordance with the present invention may be arranged so that a site where the incoming light control section is formed, the first outgoing light control section, and the second outgoing light control section are integrally formed of an identical material.

According to the arrangement, the site where the incoming light control section is formed, the first outgoing light control section, and the second outgoing light control section are integrally formed of an identical material; the number of components can therefore be reduced. As a result, in addition to effects of the above arrangement, an inexpensive, compact bidirectional optical communications module can be obtained which experiences little aging. Further, the prevention of increases of the number of components in this manner can facilitate the manufacturing process.

Further, in addition to the above arrangement, a bidirectional optical communications module in accordance with the present invention may be arranged so that: a prism is provided between the first outgoing light control section and the optical communications path element; and the prism refracts the first outgoing light so that the first outgoing light enters from a direction of a periphery of the optical communications path.

According to the arrangement, the prism refracts the first outgoing light so that the first outgoing light is coupled to the optical communications path. The optical path of the first outgoing light is adjusted by means of the refraction. In other words, the first outgoing light can be controlled so that the first outgoing light passes through extreme proximity of the incoming light control section. Moreover, the first outgoing light enters the optical communications path from the direction of the periphery of the optical communications path. "From the direction of the periphery" means that assuming an opposite face to the end face entered in transmission, the light enters from the outside of the region of that opposite face: for example, supposing an optical fiber is used as an optical communications path element, the first outgoing light enters the optical fiber from the direction of the periphery of the optical fiber (the optical communications path in the optical fiber). As a result, in addition to effects of the above arrangement, the transmitting region can be reduced in size and the receiving region can be increased in size by that much.

Further, in addition to the above arrangement, a bidirectional optical communications module in accordance with the present invention may be arranged so that: a profile of the end face of the optical communications path element is tilted with respect to an optical axis; and the optical communications path element is secured so that a side on which a cross section of the optical communications path element forms an obtuse angle due to the tilting becomes a side on which the first outgoing light enters the optical communications path element.

According to the arrangement, the profile of the end face of the optical communications path element is tilted with respect to the optical axis; and the optical communications path element is secured so that the side on which the cross section of the optical communications path element forms an obtuse angle due to the tilting becomes the side on which the first outgoing light enters the optical communications path element. The securing in a tilted position changes the direction of the light having experienced far end reflection at the end face of the optical communications path element. As a result, in addition to effects of the above arrangement, interference due to far end reflection can be reduced further.

Further, in addition to the above arrangement, a bidirectional optical communications module in accordance with the present invention may be arranged so that a profile of the end face of the optical communications path element is rendered spherical.

According to the arrangement, the profile of the end face of the optical communications path element is spherical. The sphericalness changes the direction of the light having experienced far end reflection at the end face of the optical communications path element. As a result, in addition to effects of the above arrangement, interference due to far end reflection can be reduced. Further, when the cross section of the optical communications path element is tilted, it has to be considered on which side the optical communications path element should be secured. However, rendering the profile of the end face of the optical communications path element spherical is advantageous in that it does not have to be considered on which side the optical communications path element should be secured.

Further, in addition to the above arrangement, a bidirectional optical communications module in accordance with the present invention may be arranged so that the first outgoing light control section includes multiple lenses.

According to the arrangement, the first outgoing light control section includes multiple lenses. Normally, the first outgoing light control section includes a single lens. However, the first outgoing light control section may include multiple lenses. For example, the outgoing light control section may include a first transmission lens and a second transmission lens. As a result, in addition to effects of the above arrangement, the light collecting capability of the lens can be improved, and more kinds of light-emitting devices become available for use. For example, when the outgoing light control section includes a first transmission lens and a second transmission lens, light-emitting diode (LED) which have a wider radiation angle and larger light-emitting area than semiconductor lasers can be used as light-emitting devices.

Further, in addition to the above arrangement, a bidirectional optical communications module in accordance with the present invention may be arranged so that a reception lens which collects incoming light is provided between the incoming light control section and the light-receiving device.

According to the arrangement, a reception lens which collects incoming light is provided between the incoming light control section and the light-receiving device. As a result, in addition to effects of the above arrangement, the incoming light collected by the incoming light control section is further collected by the reception lens, and reception efficiency can be improved.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A bidirectional optical communications module for bidirectionally communicating with another party, comprising:
    a single optical communications path element having an optical communications path in which an optical signal travels;
    a light-emitting device for transmitting an optical signal by causing light to enter the optical communications path through an end face of the optical communications path element;
    a light-receiving device for receiving an optical signal by receiving incoming light exiting the optical communications path through the end face of the optical communications path element;
    a first outgoing light control section which receives, of light emitted by the light-emitting device, first outgoing light to be transmitted and which controls the first outgoing light so that the first outgoing light emitted by the light-emitting device enters the optical communications path through the end face of the optical communications path element; and
    a second outgoing light control section which receives, of light emitted by the light-emitting device, second outgoing light not to be transmitted and which controls the second outgoing light so that at least part of the second outgoing light enters neither the optical communications path which receives the first outgoing light nor the end face of the optical communications path element,
    wherein the second outgoing light control section is formed continuously to a periphery of the first outgoing light control section, and the second outgoing light control section guides the second outgoing light outside the end face of the optical communications path element by refracting the second outgoing light.

2. The bidirectional optical communications module as set forth in claim 1, wherein a shield member is provided at a position hit by at least part of light having passed through the second outgoing light control section so as to absorb the light hitting the position.

3. The bidirectional optical communications module as set forth in claim 1, wherein a shield member is provided at a position hit by at least part of light having passed through the second outgoing light control section so as to reflect the light hitting the position.

4. The bidirectional optical communications module as set forth in claim 1, wherein the second outgoing light control section is arranged from a prism.

5. The bidirectional optical communications module as set forth in claim 1, wherein the second outgoing light control section is arranged from a lens.

6. The bidirectional optical communications module as set forth in claim 1, wherein the second outgoing light control section is arranged from a light-reflecting material.

7. The bidirectional optical communications module as set forth in claim 1, wherein the second outgoing light control section is arranged from a light-absorbing body.

8. The bidirectional optical communications module as set forth in claim 1, wherein the first outgoing light control section and the second outgoing light control section are integrally formed of an identical material.

9. The bidirectional optical communications module as set forth in claim 1, further comprising
    an incoming light control section including a first face and a second face which is an opposite face to the first face, the first face reflecting incoming light so as to collect the reflected incoming light to the light-receiving device, the second face reflecting light hitting the second face so as to prevent the light hitting the second face from hitting the light-receiving device.

10. The bidirectional optical communications module as set forth in claim 9, wherein a light-blocking section which blocks light having been reflected off the end face of the optical communications path element is provided on the second face of the incoming light control section.

11. The bidirectional optical communications module as set forth in claim 9, wherein a site where the incoming light control section is formed, the first outgoing light control section, and the second outgoing light control section are integrally formed of an identical material.

12. The bidirectional optical communications module as set forth in claim 1, wherein:

a prism is provided between the first outgoing light control section and the optical communications path element; and the prism refracts the first outgoing light so that the first outgoing light enters from a direction of a periphery of the optical communications path.

13. The bidirectional optical communications module as set forth in claim 1, wherein:

a profile of the end face of the optical communications path element is tilted with respect to an optical axis; and the optical communications path element is secured so that a side on which a cross section of the optical communications path element forms an obtuse angle due to the tilting becomes a side on which the first outgoing light enters the optical communications path element.

14. The bidirectional optical communications module as set forth in claim 1, wherein a profile of the end face of the optical communications path element is rendered spherical.

15. The bidirectional optical communications module as set forth in claim 1, wherein the first outgoing light control section includes multiple lenses.

16. The bidirectional optical communications module as set forth in claim 1, wherein a reception lens which collects incoming light is provided between the incoming light control section and the light-receiving device.

17. A bidirectional optical communications module for bidirectionally communicating with another party comprising:

a single optical communications path element having an optical communications path in which an optical signal travels;

a light-emitting device for transmitting an optical signal by causing light to enter the optical communications path through an end face of the optical communications path element;

a light-receiving device for receiving an optical signal by receiving incoming light exiting the optical communications path through the end face of the optical communications path element;

a first outgoing light control section which receives, of light emitted by the light-emitting device, first outgoing light to be transmitted and which controls the first outgoing light so that the first outgoing light emitted by the light-emitting device enters the optical communications path through the end face of the optical communications path element; and a second outgoing light control section which receives, of light emitted by the light-emitting device, second outgoing light not to be transmitted and which controls the second outgoing light so that at least part of the second outgoing light enters neither the optical communications path which receives the first outgoing light nor the end face of the optical communications path element, wherein the second outgoing light control section is formed continuously to a periphery of the first outgoing light control section, and the second outgoing light control section guides the second outgoing light outside the end face of the optical communications path element by reflecting the second outgoing light.

18. A bidirectional optical communications module for bidirectionally communicating with another party, comprising:

a single optical communications path element having an optical communications path in which an optical signal travels;

a light-emitting device for transmitting an optical signal by causing light to enter the optical communications path through an end face of the optical communications path element;

a light-receiving device for receiving an optical signal by receiving incoming light exiting the optical communications path through the end face of the optical communications path element;

a first outgoing light control section which receives, of light emitted by the light-emitting device, first outgoing light to be transmitted and which controls the first outgoing light so that the first outgoing light emitted by the light-emitting device enters the optical communications path through the end face of the optical communications path element; and a second outgoing light control section which receives, of light emitted by the light-emitting device, second outgoing light not to be transmitted and which controls the second outgoing light so that at least part of the second outgoing light enters neither the optical communications path which receives the first outgoing light nor the end face of the optical communications path element, wherein the second outgoing light control section is formed continuously to a periphery of the first outgoing light control section, the second outgoing light control section is arranged from a prism, and the second outgoing light control section has a shape such that the first outgoing light control section is placed in a center of a conical dent carved out of a cylinder.

19. A bidirectional optical communications module for bidirectionally communicating with another party, a single optical communications path element having an optical communications path in which an optical signal travels;

a light-emitting device for transmitting an optical signal by causing light to enter the optical communications path through an end face of the optical communications path element;

a light-receiving device for receiving an optical signal by receiving incoming light exiting the optical communications path through the end face of the optical communications path element;

a first outgoing light control section which receives, of light emitted by the light-emitting device, first outgoing light to be transmitted and which controls the first outgoing light so that the first outgoing light emitted by the light-emitting device enters the optical communications path through the end face of the optical communications path element; and a second outgoing light control section which receives, of light emitted by the light-emitting device, second outgoing light not to be transmitted and which controls the second outgoing light so that at least part of the second outgoing light enters neither the optical communications path which receives the first outgoing light nor the end face of the optical communications path element, wherein the second outgoing light control section is formed continuously to a periphery of the first outgoing light control section, the second outgoing light control section is arranged from a lens, and the second outgoing light control section has a shape such that the first outgoing light control section is placed in a center of a hemispheric dent carved out of a cylinder.

20. A bidirectional optical communications module for bidirectionally communicating with another party, a single optical communications path element having an optical communications path in which an optical signal travels;

a light-emitting device for transmitting an optical signal by causing light to enter the optical communications path through an end face of the optical communications path element;

a light-receiving device for receiving an optical signal by receiving incoming light exiting the optical communications path through the end face of the optical communications path element;

an incoming light control section including a first face and a second face which is an opposite face to the first face, the first face reflecting incoming light so as to collect the reflected incoming light to the light-receiving device, the second face reflecting light hitting the second face so as to prevent the light hitting the second face from hitting the light-receiving device;

a first outgoing light control section which receives, of light emitted by the light-emitting device, first outgoing light to be transmitted and which controls the first outgoing light so that the first outgoing light emitted by the light-emitting device enters the optical communications path through the end face of the optical communications path element; and a second outgoing light control section which receives, of light emitted by the light-emitting device, second outgoing light not to be transmitted and which controls the second outgoing light so that at least part of the second outgoing light enters neither the optical communications path which receives the first outgoing light nor the end face of the optical communications path element, wherein a path of the second outgoing light is different from a path which is from the light emitting device to the second face of the incoming light control section.

* * * * *